(12) United States Patent
Inoue et al.

(10) Patent No.: US 12,363,267 B2
(45) Date of Patent: Jul. 15, 2025

(54) CONTROL METHOD, PROJECTION APPARATUS, AND CONTROL PROGRAM

(71) Applicant: FUJIFILM Corporation, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 451 days.

(21) Appl. No.: 18/047,061

(22) Filed: Oct. 17, 2022

(65) Prior Publication Data

US 2023/0127139 A1 Apr. 27, 2023

Related U.S. Application Data

(63) Continuation of application No. PCT/JP2021/008304, filed on Mar. 3, 2021.

(30) Foreign Application Priority Data

Apr. 30, 2020 (JP) ................................. 2020-080732

(51) Int. Cl.
*H04N 9/31* (2006.01)
*G06T 7/00* (2017.01)
*G06T 7/20* (2017.01)

(52) U.S. Cl.
CPC ............. *H04N 9/3188* (2013.01); *G06T 7/20* (2013.01); *G06T 7/97* (2017.01); *H04N 9/3147* (2013.01)

(58) Field of Classification Search
CPC .... H04N 9/315; H04N 9/3147; H04N 9/3185; H04N 9/3188; G03B 21/005;
(Continued)

(56) References Cited

U.S. PATENT DOCUMENTS 6,982,682 B1 1/2006 Kaulgud et al.
9,261,723 B1 2/2016 Budni
(Continued)

FOREIGN PATENT DOCUMENTS

CN 102170573 A 8/2011
CN 107295319 A 10/2017
(Continued)

OTHER PUBLICATIONS

Japanese Office Action for corresponding Japanese Application No. 2022-517519, dated Jul. 25, 2023, with English translation.
(Continued)

*Primary Examiner* — Sultan Chowdhury
(74) *Attorney, Agent, or Firm* — Birch, Stewart, Kolasch & Birch, LLP

(57) ABSTRACT

A control method of a projection system, that includes a first projection portion, a second projection portion and a processor, and performs projection based on a content image, includes: by the processor, setting, based on input information, a coordinate space corresponding to a non-projection range between a first projection range of the first projection portion and a second projection range of the second projection portion; and performing a control of generating a first projection image and a second projection image based on the set coordinate space and the content image, causing the first projection portion to project the first projection image, and causing the second projection portion to project the second projection image.

24 Claims, 22 Drawing Sheets

(58) Field of Classification Search
CPC .... G03B 21/006; G03B 21/28; G03B 21/147; G03B 37/00; G03B 37/04; G09G 5/00; G09G 5/36; G06T 7/20; G06T 7/97
See application file for complete search history.

(56) References Cited

U.S. PATENT DOCUMENTS

| | | | |
|---|---|---|---|
| 10,080,002 B2 | 9/2018 | Kasuga et al. | |
| 2011/0210979 A1* | 9/2011 | Furui | G03B 37/04 345/619 |
| 2016/0127711 A1 | 5/2016 | Kim et al. | |
| 2016/0179453 A1* | 6/2016 | Jepsen | G06F 3/1446 345/1.3 |
| 2017/0127020 A1 | 5/2017 | Takahashi et al. | |
| 2017/0180689 A1* | 6/2017 | Morrison | H04N 9/3194 |

FOREIGN PATENT DOCUMENTS

| | | |
|---|---|---|
| JP | 2011-182078 A | 9/2011 |
| JP | 2012-113244 A | 6/2012 |
| JP | 2015-103880 A | 6/2015 |
| JP | 2016-75883 A | 5/2016 |
| JP | 2017-504990 A | 2/2017 |
| JP | 2018-97080 A | 6/2018 |

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2020/038300, dated Apr. 21, 2022.
International Search Report (Form PCT/ISA/210) for International Application No. PCT/JP2020/038300, dated Dec. 8, 2020, with English translation.
International Preliminary Report on Patentability and English translation of the Written Opinion of the International Searching Authority (Forms PCT/IB/326, PCT/IB/373 and PCT/ISA/237) for International Application No. PCT/JP2021/008304, dated Nov. 10, 2022.
International Search Report (Form PCT/ISA/210) for International Application No. PCT/JP2021/008304, dated May 25, 2021, with English translation.
Chinese Office Action and Search Report for corresponding Chinese Application No. 202180031643.0, dated Jun. 17, 2024, with English translation.

* cited by examiner

FIG. 7
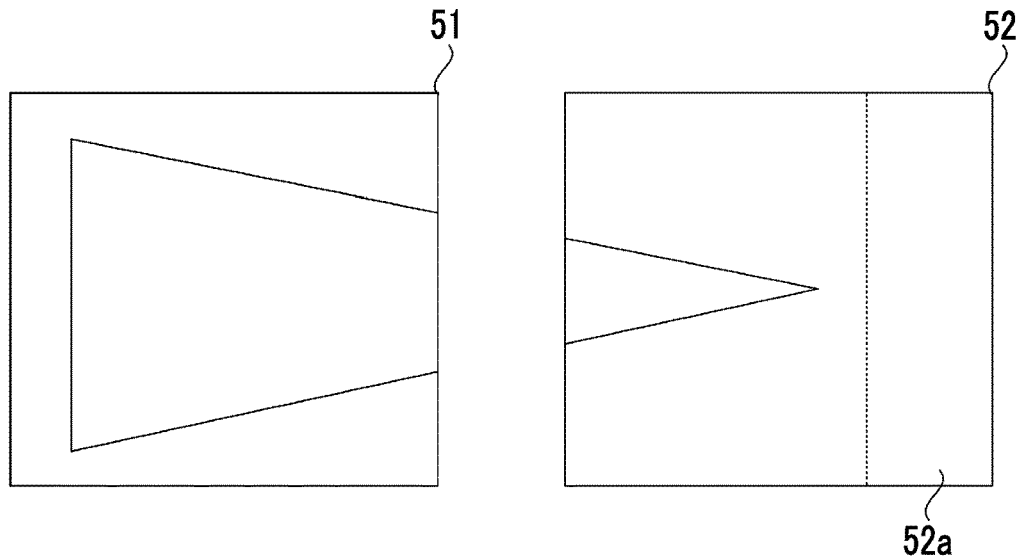
FIG. 8
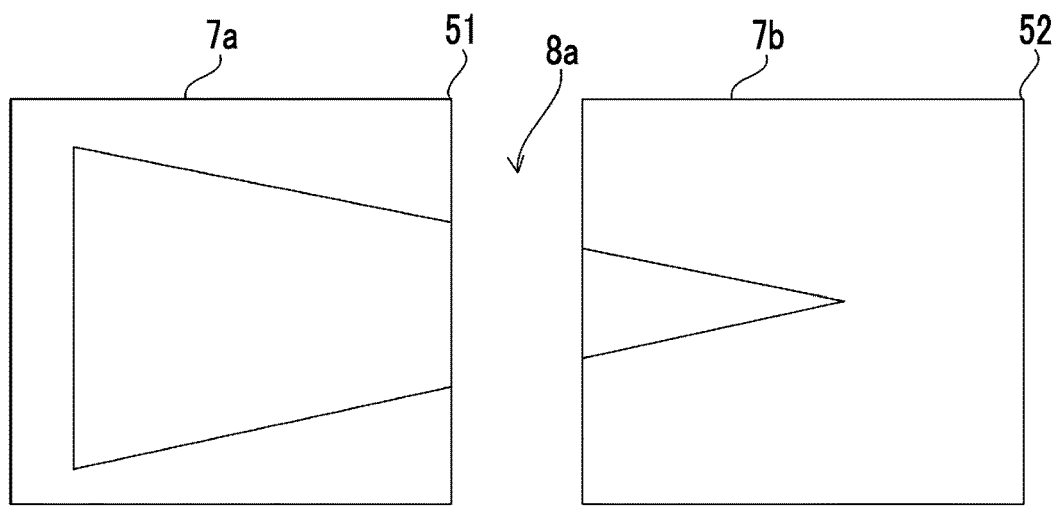
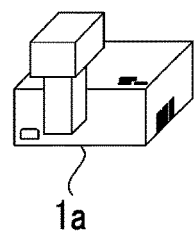
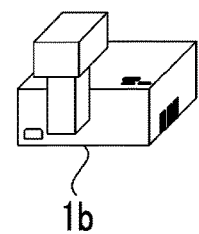

FIG. 9
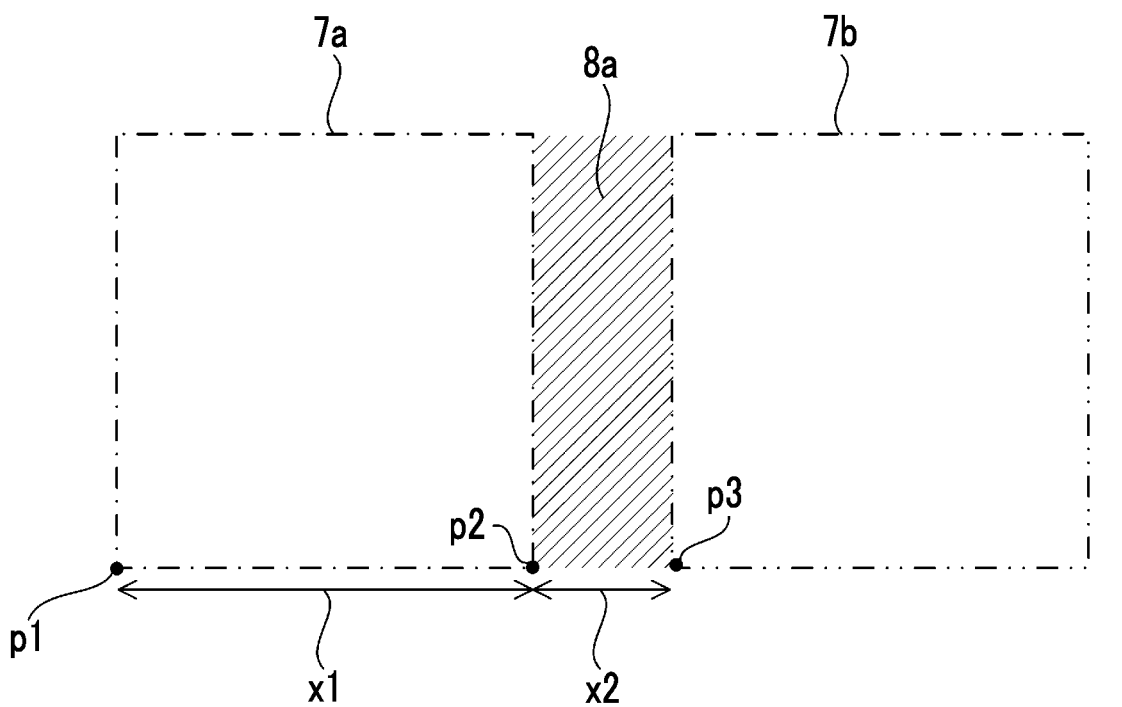
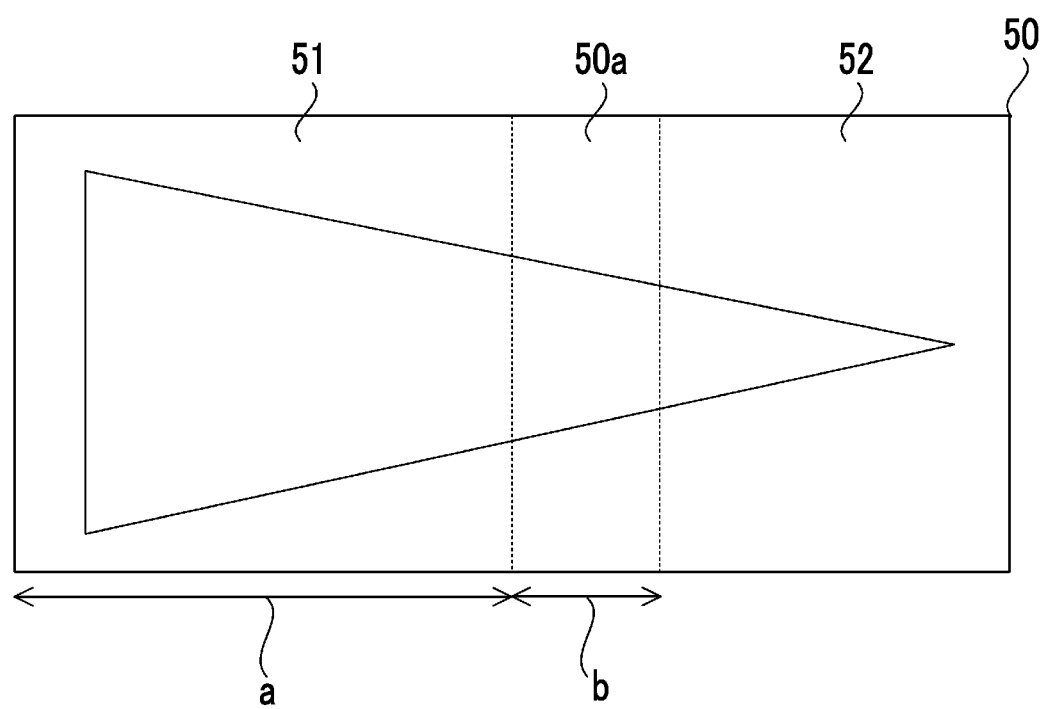

FIG. 15
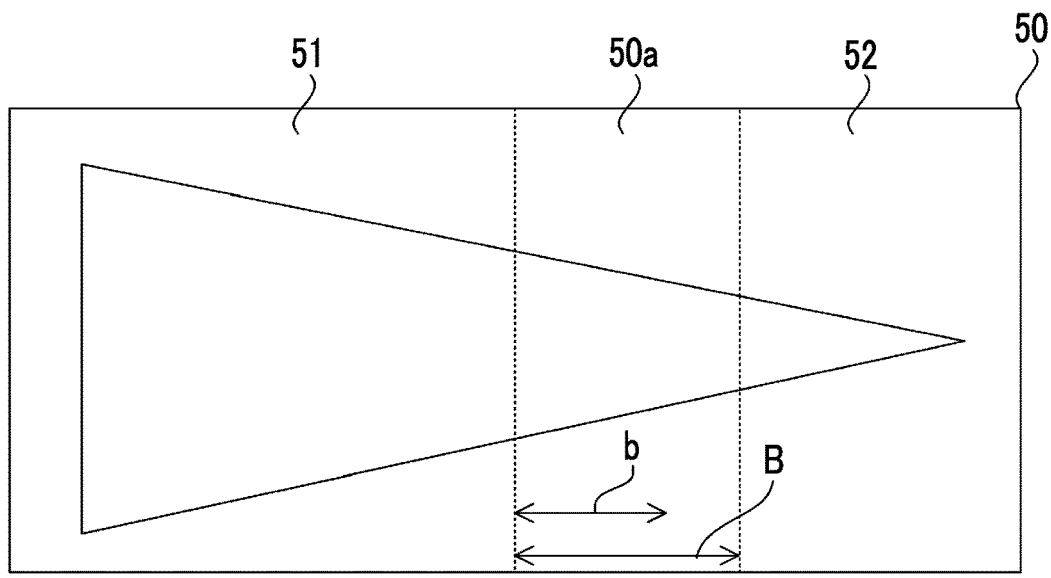
FIG. 16
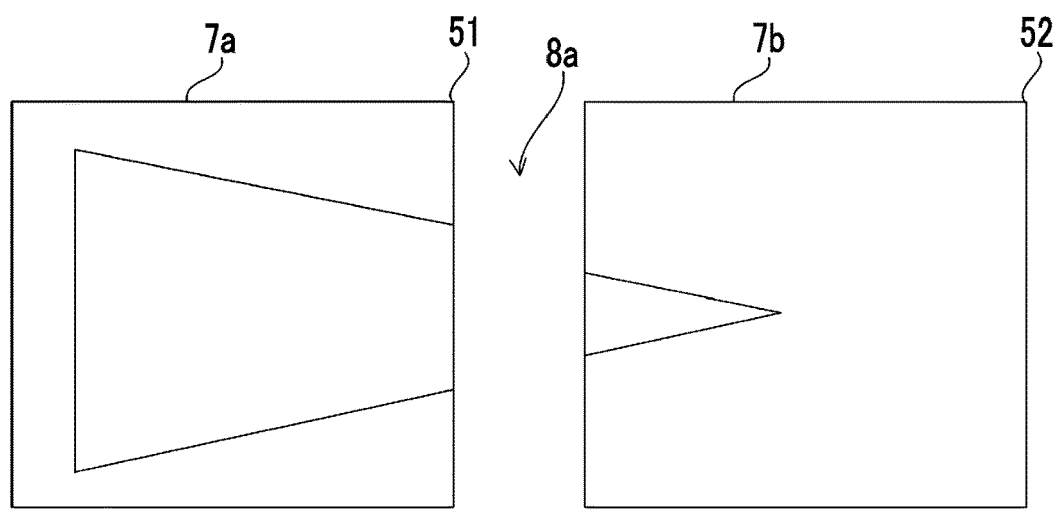
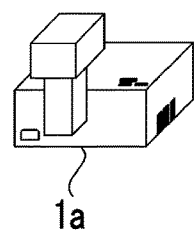
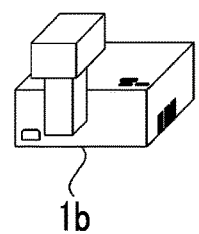

FIG. 17
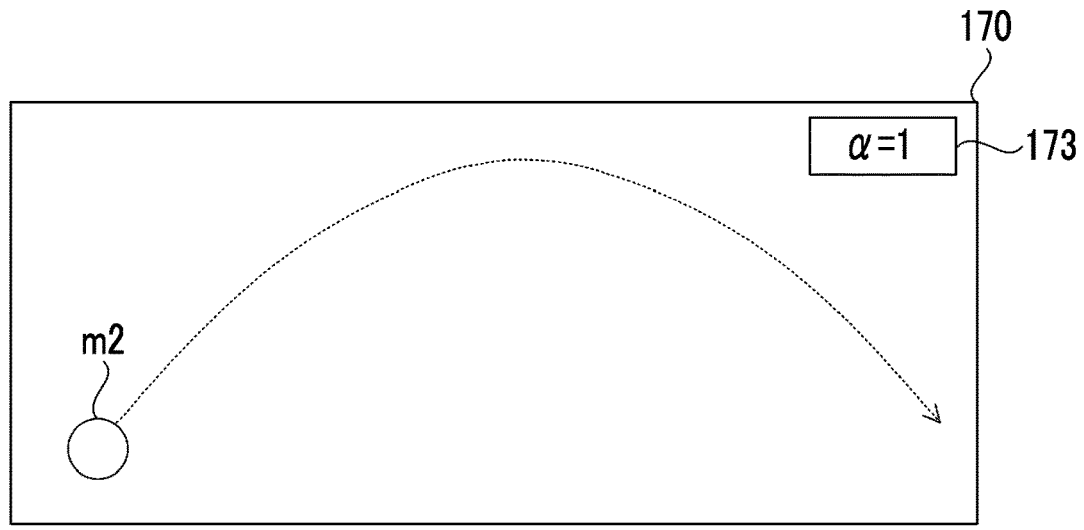
FIG. 18
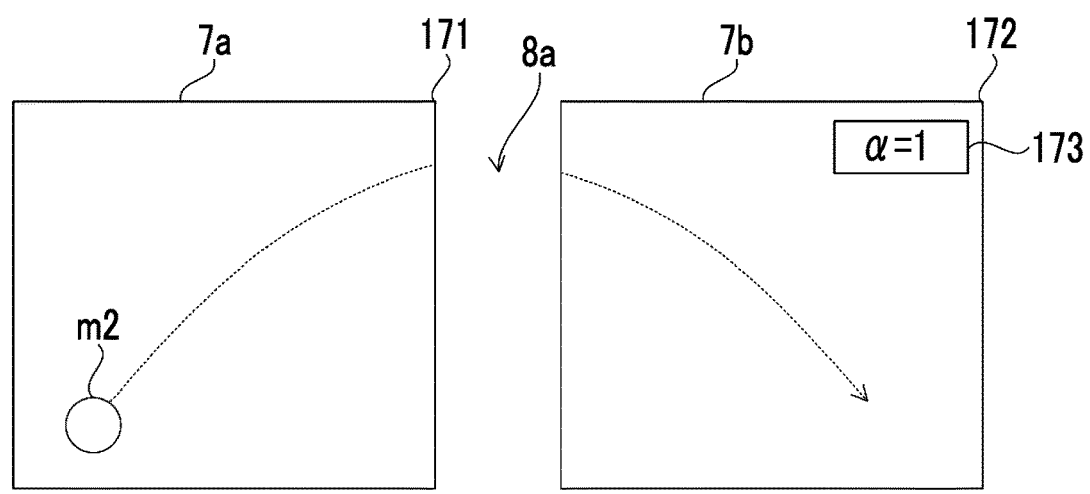
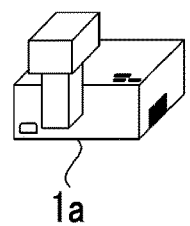
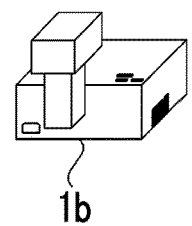

FIG. 19
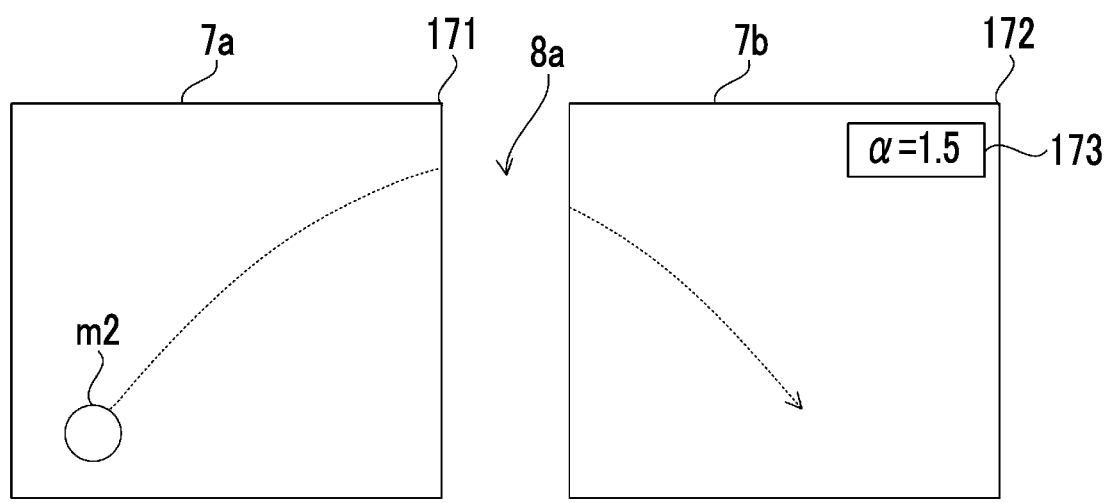
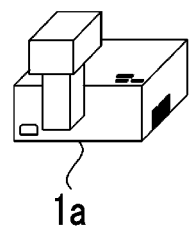
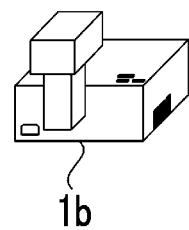

FIG. 23
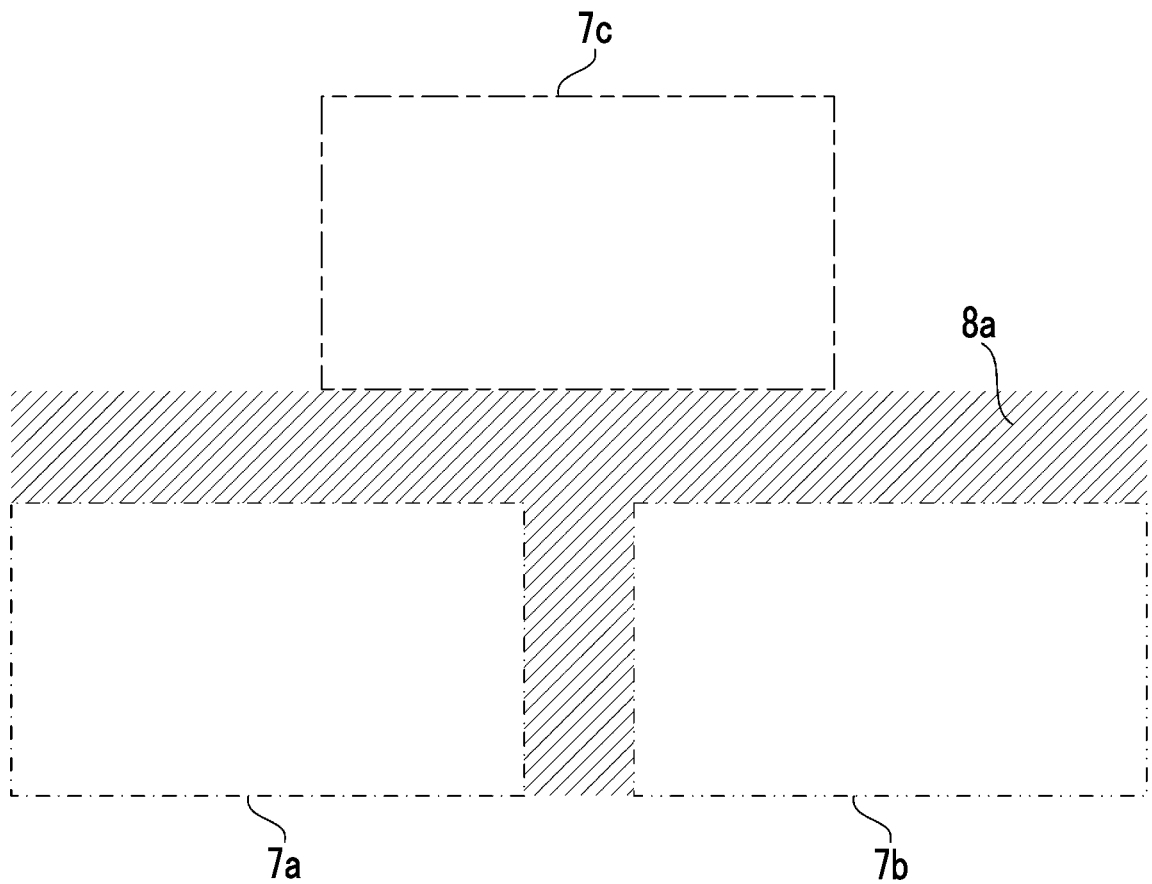
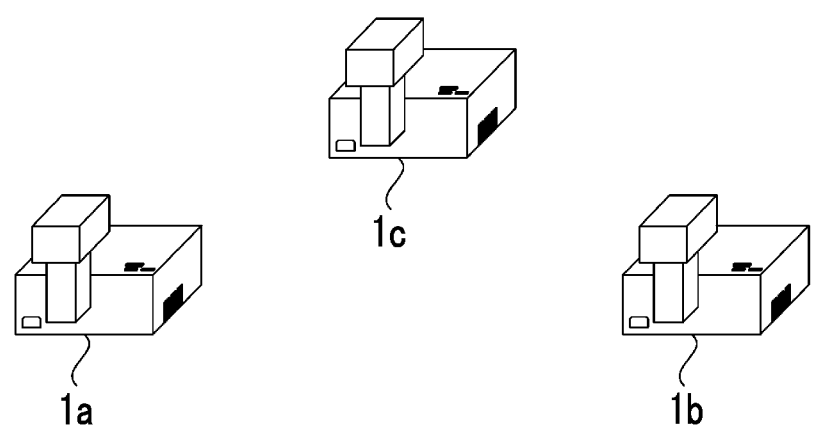

CONTROL METHOD, PROJECTION APPARATUS, AND CONTROL PROGRAM

CROSS REFERENCE TO RELATED APPLICATION

This is a continuation of International Application No. PCT/JP2021/008304 filed on Mar. 3, 2021, and claims priority from Japanese Patent Application No. 2020-080732 filed on Apr. 30, 2020, the entire disclosures of which are incorporated herein by reference.

BACKGROUND OF THE INVENTION

1. Field of the Invention

The present invention relates to a control method, a projection apparatus, and a computer readable medium storing a control program.

2. Description of the Related Art

JP2012-113244A discloses an image projection system configured to, in order to generate a natural image for tile display, decrease a region in which an image is not projected by controlling an area of a gap between projection screens in accordance with a distance between the projection screens.

SUMMARY OF THE INVENTION

One embodiment according to the disclosed technology provides a control method, a projection apparatus, and a computer readable medium storing a control program that can flexibly control an impression of a content image projected in a divided manner.

A control method of an embodiment according to the disclosed technology is a control method of a projection system that includes a first projection portion, a second projection portion, and a processor and performs projection based on a content image, the control method comprising, by the processor, setting a coordinate space corresponding to a non-projection range between a first projection range of the first projection portion and a second projection range of the second projection portion based on input information, and performing a control of generating a first projection image and a second projection image based on the set coordinate space and the content image, causing the first projection portion to project the first projection image, and causing the second projection portion to project the second projection image.

A projection apparatus of another embodiment according to the disclosed technology is a projection apparatus that performs projection based on a content image, the projection apparatus comprising a first projection portion, a second projection portion, and a processor, in which the processor is configured to set a coordinate space corresponding to a non-projection range between a first projection range of the first projection portion and a second projection range of the second projection portion based on input information, and perform a control of generating a first projection image and a second projection image based on the set coordinate space and the content image, causing the first projection portion to project the first projection image, and causing the second projection portion to project the second projection image.

A control program, which is stored in a computer readable medium, of a projection apparatus that includes a first projection portion, a second projection portion, and a processor and performs projection based on a content image, the control program causing the processor to execute a process comprising setting a coordinate space corresponding to a non-projection range between a first projection range of the first projection portion and a second projection range of the second projection portion based on input information, and performing a control of generating a first projection image and a second projection image based on the set coordinate space and the content image, causing the first projection portion to project the first projection image, and causing the second projection portion to project the second projection image.

According to the present invention, a control method, a projection apparatus, and a computer readable medium storing a control program that can flexibly control an impression of a content image projected in a divided manner can be provided.

BRIEF DESCRIPTION OF THE DRAWINGS

FIG. 7 is a diagram (Part 3) illustrating an example of the divided projection of the content image by the projection system 10.

FIG. 8 is a diagram (Part 4) illustrating an example of the divided projection of the content image by the projection system 10.

FIG. 9 is a diagram for describing Specific Example 1 of setting of a coordinate space by the projection system 10.

FIG. 15 is a diagram (Part 1) illustrating an example of correction of the coordinate space by the projection system 10.

FIG. 16 is a diagram (Part 2) illustrating an example of the correction of the coordinate space by the projection system 10.

FIG. 17 is a diagram (Part 1) illustrating an example of projection of a checking image by the projection system 10.

FIG. 18 is a diagram (Part 2) illustrating an example of the projection of the checking image by the projection system 10.

FIG. 19 is a diagram (Part 3) illustrating an example of the projection of the checking image by the projection system 10.

FIG. 23 is a diagram (Part 2) illustrating a specific example of the non-projection range 8a in the projection system 10 illustrated in FIG. 21.

DESCRIPTION OF THE PREFERRED EMBODIMENTS

Figure 1:
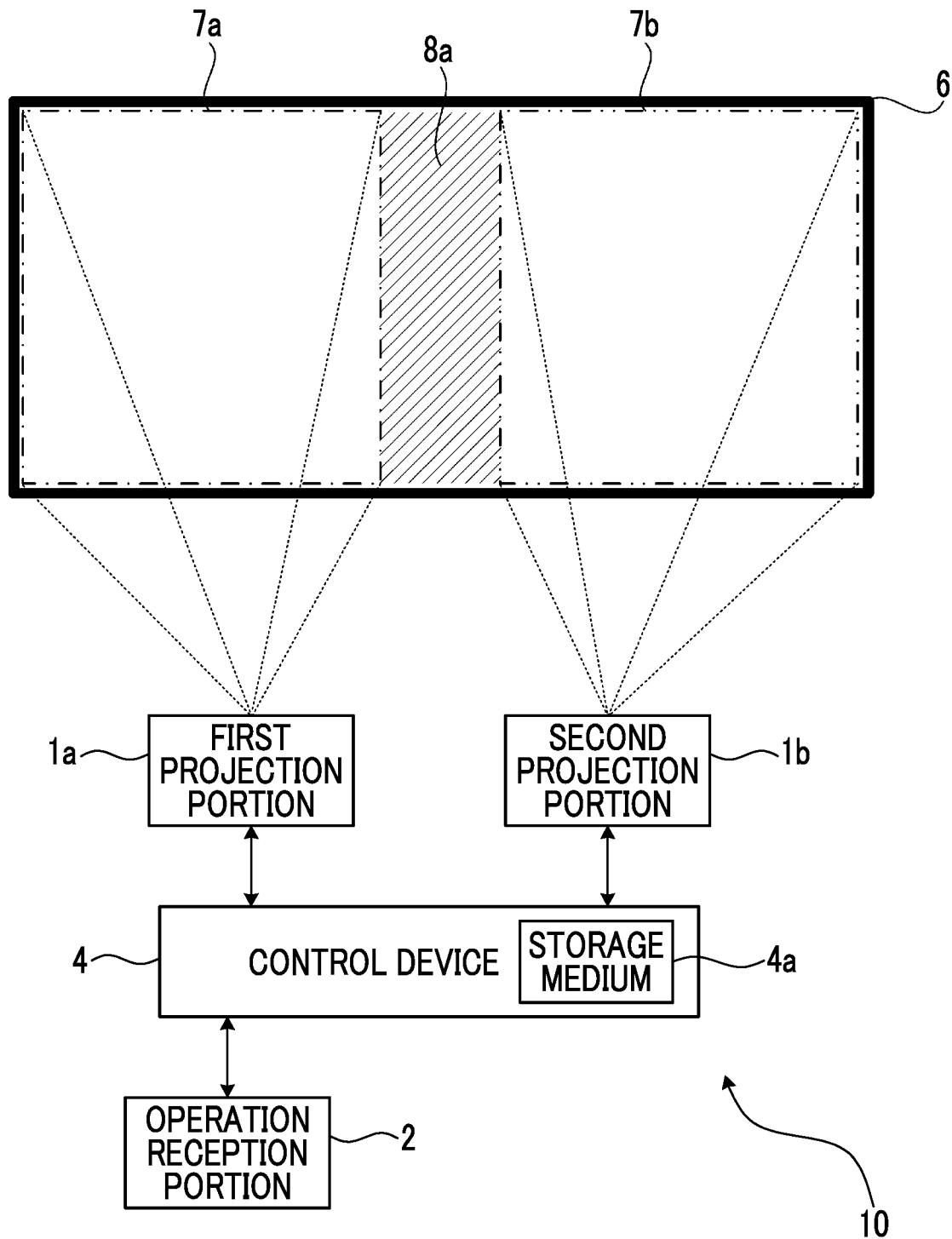
FIG. 1 is a schematic diagram illustrating a schematic configuration of a projection system 10 that is an embodiment of a projection system according to the present invention.

Schematic Configuration of Projection System 10 That Is Embodiment of Projection System According to Present Invention FIG. 1 is a schematic diagram illustrating a schematic configuration of a projection system 10 that is an embodiment of a projection system according to the present invention.

The projection system 10 comprises a first projection portion 1a and a second projection portion 1b, a control device 4, and an operation reception portion 2. In addition, the projection system 10 is an example of a projection apparatus. For example, each of the first projection portion 1a and the second projection portion 1b is configured with a liquid crystal projector or a projector using liquid crystal on silicon (LCOS).

Hereinafter, each of the first projection portion 1a and the second projection portion 1b will be described as a liquid crystal projector.

The control device 4 is a device including a control portion configured with various processors, a communication interface (not illustrated) for communicating with each portion, and a storage medium 4a such as a hard disk, a solid state drive (SSD), or a read only memory (ROM) and generally controls the first projection portion 1a, the second projection portion 1b, and the operation reception portion 2.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control device 4 or a reception portion or the like that receives a signal from a remote controller for remotely operating the control device 4. The operation reception portion 2 is an example of an input portion that can receive an input from the user.

The first projection portion 1a, the second projection portion 1b, the control device 4, and the operation reception portion 2 are implemented by, for example, one device. Alternatively, the first projection portion 1a, the second projection portion 1b, the control device 4, and the operation reception portion 2 may be implemented by a plurality of devices that cooperate by communicating with each other.

A projection object 6 is a projection object having a projection surface on which a projection image is displayed by the first projection portion 1a and the second projection portion 1b. In the example illustrated in FIG. 1, the projection surface of the projection object 6 is rectangular. Upper, lower, left, and right sides of the projection object 6 in FIG. 1 are upper, lower, left, and right sides of the actual projection object 6.

A first projection range 7a illustrated by a dot dashed line is a region irradiated with projection light by the first projection portion 1a. A second projection range 7b illustrated by a double dot dashed line is a region irradiated with projection light by the second projection portion 1b. In the example illustrated in FIG. 1, each of the first projection range 7a and the second projection range 7b is rectangular.

For example, the projection system 10 displays a horizontally long image on the projection object 6 by dividing a content image into two divided images, projecting a divided image to the first projection range 7a from the first projection portion 1a, projecting a divided image to the second projection range 7b from the second projection portion 1b, and connecting the two divided images.

In addition, the projection system 10 is provided such that the first projection range 7a and the second projection range 7b are at an interval from each other. That is, a non-projection range 8a (diagonal line portion in FIG. 1) in which projection is not performed is present between the first projection range 7a and the second projection range 7b.

Accordingly, in a case where the divided images are simply projected to each of the first projection range 7a and the second projection range 7b, the divided images are displayed at a distance corresponding to a width of the non-projection range 8a from each other. Thus, unity as the content image deteriorates, and the divided images look unnatural to a person who sees the images. Regarding this point, the projection system 10 can reduce the unnatural look by generating each image projected to the first projection range 7a and the second projection range 7b by considering the non-projection range 8a.

Specifically, the projection system 10 sets a coordinate space corresponding to the non-projection range 8a based on input information and generates each image projected to the first projection range 7a and the second projection range 7b based on the set coordinate space and the content image.

For example, the coordinate space is information indicating a part between a part corresponding to a first projection image projected to the first projection range 7a and a part corresponding to a second projection image projected to the second projection range 7b in the content image, that is, a non-projection part in which projection is not performed.

For example, the projection system 10 performs a control of generating a first projection image 51 and a second projection image 52 based on each of the parts (the first projection range 7a and the second projection range 7b) between which the non-projection range 8a is interposed in a content image 50. Specifically, the projection system 10 generates the first projection image and the second projection image by dividing the content image into the first projection image 51 projected to the first projection range 7a, the second projection image 52 projected to the second projection range 7b, and a non-projection part 50a between the first projection image 51 and the second projection image 52. That is, the projection system 10 generates each of the parts between which the non-projection part is interposed as the first projection image and the second projection image by dividing the content image into the non-projection part based on the coordinate space and each of the parts between which the non-projection part is interposed (for example, refer to FIG. 6 and FIG. 7). The projection system 10 causes the first projection portion 1a to project the generated first projection image and causes the second projection portion 1b to project the generated second projection image.

Accordingly, by setting the coordinate space in accordance with the non-projection range 8a, a part (non-projection part) set as the coordinate space in the content image is not projected, and the parts between which the coordinate space is interposed in the content image correspond to the first projection image and the second projection image projected to the first projection range 7a and the second projection range 7b, respectively. Accordingly, it is possible to suppress deterioration of the unity as the content image and reduce the unnatural look.

By setting the coordinate space based on the input information, an impression of the content image projected in a divided manner can be flexibly controlled in accordance with the non-projection range 8a that changes depending on arrangement and the like of the first projection portion 1a and the second projection portion 1b.

Internal Configuration of First Projection Portion 1a and Second Projection Portion 1b Illustrated in FIG. 1

Figure 2:
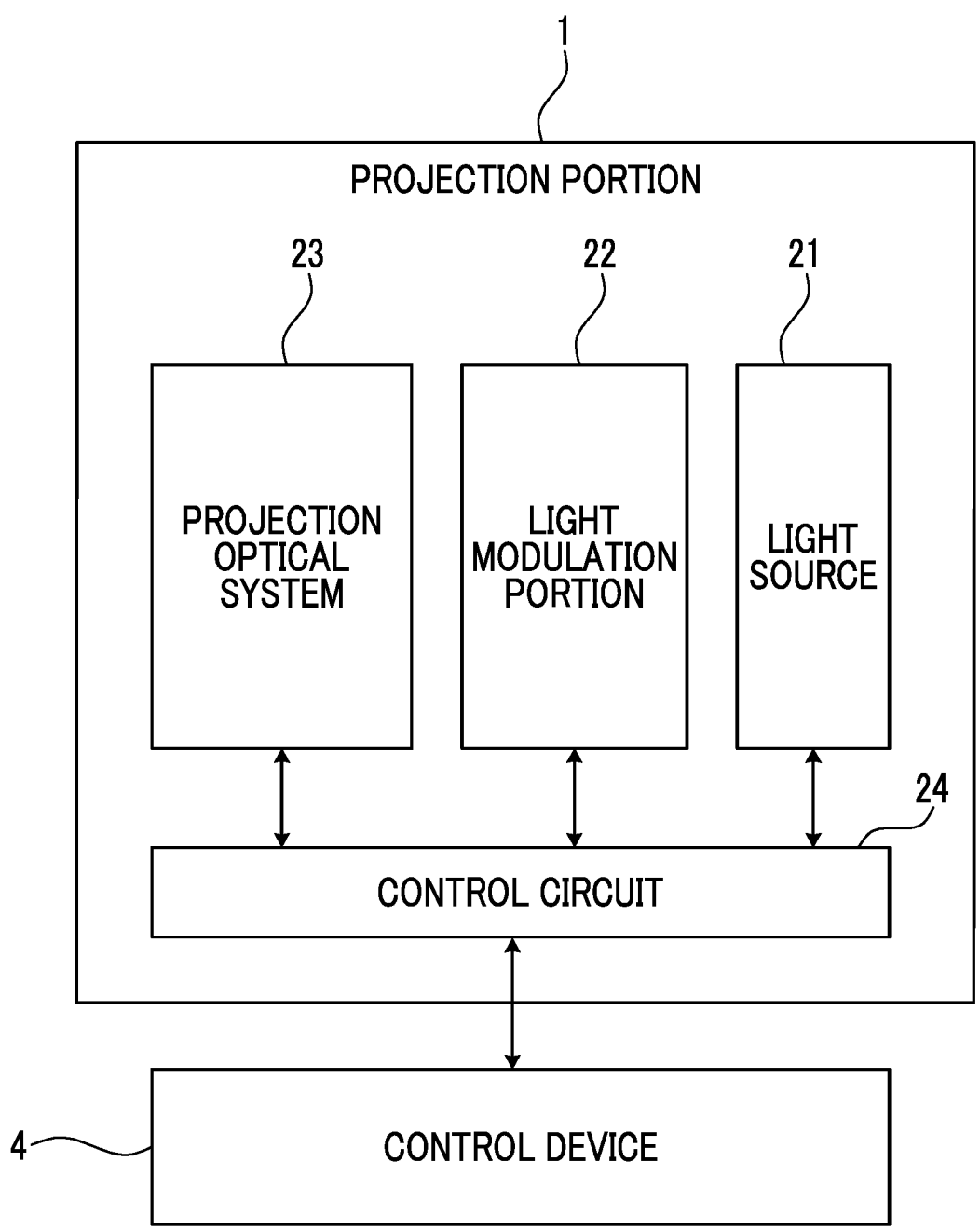
FIG. 2 is a schematic diagram illustrating an example of an internal configuration of a first projection portion 1a and a second projection portion 1b illustrated in FIG. 1.

FIG. 2 is a schematic diagram illustrating an example of an internal configuration of the first projection portion 1a and the second projection portion 1b illustrated in FIG. 1.

For example, each of the first projection portion 1a and the second projection portion 1b illustrated in FIG. 1 can be implemented by a projection portion 1 illustrated in FIG. 2. The projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is composed of, for example, a relay optical system. The light that has passed through the projection optical system 23 is projected to the projection object 6.

The control circuit 24 projects an image based on display data to the projection object 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces a projection range of the projection portion 1 by changing the projection optical system 23 based on an instruction input from the control device 4. In addition, the control device 4 may move the projection range of the projection portion 1 by changing the projection optical system 23 based on an operation received by the operation reception portion 2 from the user.

In addition, the projection system 10 comprises a shift mechanism that mechanically or optically moves the projection range while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection range by changing a range through which the light is transmitted in the light modulation portion 22.

Mechanical Configuration of Projection Portion 1

Figure 3:
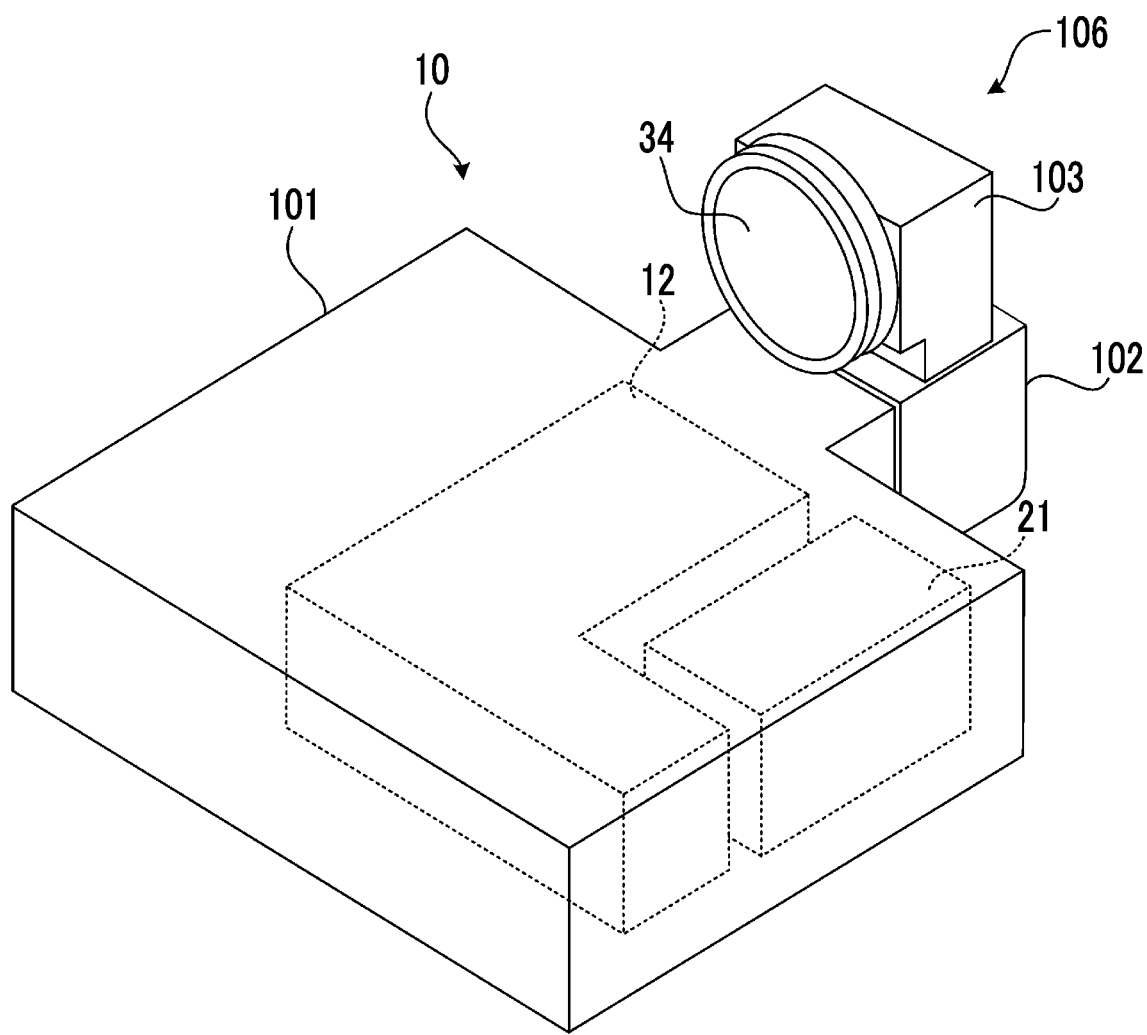
FIG. 3 is a schematic diagram illustrating an exterior configuration of a projection portion 1.
Figure 4:
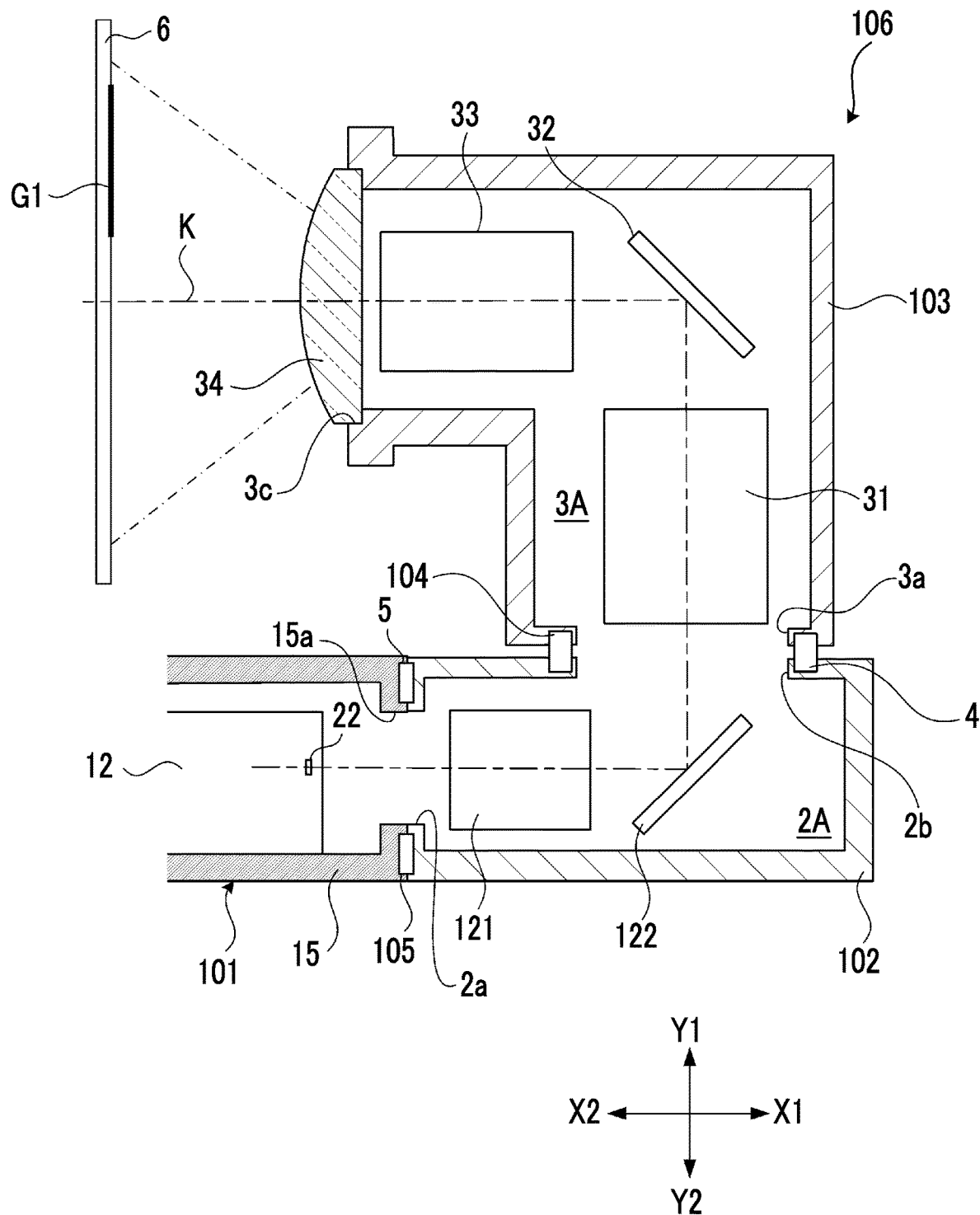
FIG. 4 is a schematic cross-sectional view of an optical unit 106 of the projection portion 1 illustrated in FIG. 3.
Figure 5:
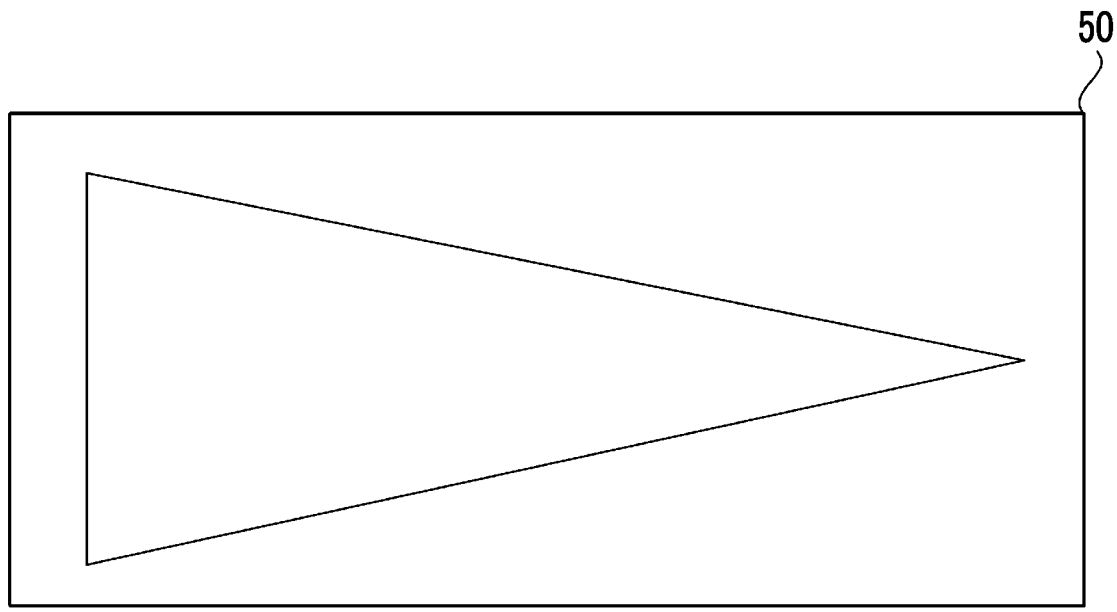
FIG. 5 is a diagram (Part 1) illustrating an example of divided projection of a content image by the projection system 10.

FIG. 3 is a schematic diagram illustrating an exterior configuration of the projection portion 1. FIG. 4 is a schematic cross-sectional view of an optical unit 106 of the projection portion 1 illustrated in FIG. 3. FIG. 4 illustrates a cross section in a plane along an optical path of the light emitted from a body part 101 illustrated in FIG. 3.

As illustrated in FIG. 3, the projection portion 1 comprises the body part 101 and the optical unit 106 that is provided to protrude from the body part 101. In the configuration illustrated in FIG. 3, the light source 21, the light modulation portion 22, and the control circuit 24 in the projection portion 1 illustrated in FIG. 2 are provided in the body part 101. The projection optical system 23 in the projection portion 1 is provided in the optical unit 106.

In a case of implementing each of the first projection portion 1a and the second projection portion 1b by the projection portion 1, the operation reception portion 2 and the control device 4 may be configured as a part of any of two projection portions 1 constituting the first projection portion 1a and the second projection portion 1b or may be configured as a configuration separated from the two projection portions 1 constituting the first projection portion 1a and the second projection portion 1b.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 through the opening 15a of the housing 15 and is projected to the projection object 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection system 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the projection object 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the projection object 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the projection object 6 can be moved in the direction Y2.

Divided Projection of Content Image by Projection System 10

FIG. 5 to FIG. 8 are diagrams illustrating an example of divided projection of the content image by the projection system 10. For example, the projection system 10 divides the content image 50 illustrated in FIG. 5 into two images and projects the divided images from the first projection portion 1a and the second projection portion 1b. In the example illustrated in FIG. 5, the content image 50 is a still picture showing an isosceles triangle having a perpendicular base. However, the content image 50 is not limited thereto and may be a photo image obtained by imaging performed by an imaging apparatus, a motion picture image, or the like.

Figure 6:
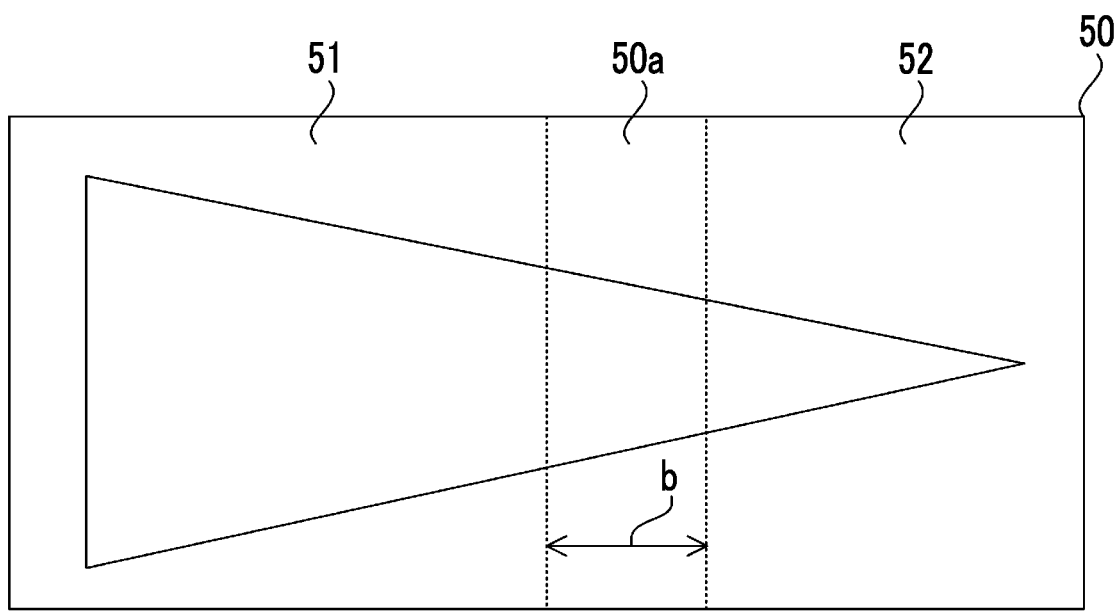
FIG. 6 is a diagram (Part 2) illustrating an example of the divided projection of the content image by the projection system 10.

As illustrated in FIG. 6, the control device 4 sets the coordinate space corresponding to the non-projection range 8a illustrated in FIG. 1 based on the input information and divides the content image 50 into the first projection image 51, the second projection image 52, and the non-projection part 50a based on the set coordinate space using two straight lines in a vertical direction.

For example, the first projection image 51 is an image extracted from a left side of the content image 50 in accordance with an aspect ratio of the first projection range 7a. The non-projection part 50a is an image that is adjacent to a right side of the first projection image 51 and has a width b based on the coordinate space corresponding to the non-projection range 8a. The second projection image 52 is an image obtained by excluding the first projection image 51 and the non-projection part 50a from the content image 50.

Next, as illustrated in FIG. 7, the control device 4 acquires the first projection image 51 as an image projected to the first projection range 7a and acquires the second projection image 52 as an image projected to the second projection range 7b. In addition, as in the example illustrated in FIG. 7, the control device 4 may perform processing of matching an aspect ratio of the second projection image 52 to an aspect ratio of the second projection range 7b by adding a complementary image 52a to a right side of the second projection image 52. The complementary image 52a is a uniform image having the same color (for example, white) as a region other than the isosceles triangle in the content image 50.

The control device 4 may generate the first projection image 51 and the second projection image 52 projected from the first projection portion 1a and the second projection portion 1b in accordance with the aspect ratios of the first projection range 7a and the second projection range 7b, respectively. Accordingly, projection without an unnatural look can be performed even in a case where image processing considering the non-projection range 8a is performed.

Next, as illustrated in FIG. 8, the control device 4 projects the acquired first projection image 51 to the first projection range 7a from the first projection portion 1a and projects the acquired second projection image 52 to the second projection range 7b from the second projection portion 1b. Accordingly, it is possible to project the first projection image 51 and the second projection image 52 without projecting the non-projection part 50a corresponding to the non-projection range 8a.

Accordingly, for example, an unnatural look of display of the content image 50 caused by presence of the non-projection range 8a can be reduced, compared to a case (not illustrated) where images obtained by dividing the content image 50 into two images are simply projected to the first projection range 7a and the second projection range 7b, respectively.

A method of dividing the content image 50 into the first projection image 51, the second projection image 52, and the non-projection part 50a is not limited to the example illustrated in FIG. 5 to FIG. 8. The division can be performed based on sizes, shapes, arrangement, and the like of the first projection range 7a and the second projection range 7b. For example, in a case where the first projection range 7a and the second projection range 7b are arranged in the vertical direction, the content image 50 may be divided using two straight lines in a horizontal direction.

In addition, while a case of extracting the first projection image 51 from the left side of the content image 50 in accordance with the aspect ratio of the first projection range 7a is described, the control device 4 may extract the second projection image 52 from a right side of the content image 50 in accordance with the aspect ratio of the second projection range 7b. In this case, the control device 4 sets a part having the width b and adjacent to a left side of the second projection image 52 in the content image 50 as the non-projection part 50a and sets a part excluding the second projection image 52 and the non-projection part 50a in the content image 50 as the first projection image 51.

Next, a specific example of setting the coordinate space based on the input information will be described.

Specific Example 1 of Setting of Coordinate Space by Projection System 10

FIG. 9 is a diagram for describing Specific Example 1 of setting of the coordinate space by the projection system 10. In FIG. 9, x1 denotes a length (actual length on the projection object 6) of the first projection range in an arrangement direction (in this example, the horizontal direction) of the first projection range 7a and the second projection range 7b. In addition, x2 denotes a distance (actual distance on the projection object 6) between the first projection range 7a and the second projection range 7b. For example, x1 and x2 are input from the user by performing an operation on the operation reception portion 2 (as an example, an operation of a ten key or the like).

In addition, a denotes the number of pixels of the first projection image 51 in the arrangement direction (in this example, the horizontal direction) of the first projection range 7a and the second projection range 7b. For example, the control device 4 calculates a based on the number of pixels of the content image 50 in the vertical direction and an aspect ratio of the first projection image 51.

In addition, b denotes the coordinate space indicating the non-projection part 50a in the content image 50. In this example, the coordinate space is represented by the number of pixels of the non-projection part 50a in the horizontal direction. For example, the control device 4 calculates b based on Expression (1) below and sets calculated b as the coordinate space. Since b is the number of pixels, a calculation result of b is rounded to an integer.

$$b = a \times (x2/x1) \ldots \quad (1)$$

While a configuration in which x1 and x2 are input from the user by performing the operation on the operation reception portion 2 is described, the present invention is not limited to such a configuration. For example, a configuration in which coordinates (coordinates associated with an actual position on the projection object 6) of each of a lower left point p1 of the first projection range 7a, a lower right point p2 (lower left point of the non-projection range 8a) of the first projection range 7a, and a lower right point p3 of the non-projection range 8a are input from the user by performing the operation on the operation reception portion 2 may be used.

In this case, for example, the operation performed on the operation reception portion 2 is an operation of inputting numerical values of the coordinates. Alternatively, the operation performed on the operation reception portion 2 in this case may be an operation or the like of a pointer with which coordinates on the projection object 6 can be designated using an acceleration sensor or the like. In this case, the operation reception portion 2 is an example of an indicator with which an instruction for the non-projection range 8a can be provided. The control device 4 calculates x1 and x2 based on the coordinates of each of the input points p1 to p3 and sets the coordinate space as described above based on calculated x1 and x2.

Alternatively, while illustration is not provided, an imaging apparatus that images the projection object 6 may be provided in the projection system 10, and the coordinates of each of the points p1 to p3 may be acquired based on image analysis of a captured image obtained by imaging performed by the imaging apparatus. Even in this case, the control device 4 calculates x1 and x2 based on the acquired coordinates of each of the points p1 to p3 and sets the coordinate space based on calculated x1 and x2.

A relationship between the actual distance such as x1 and x2 on the projection object 6 and the number of pixels of the content image 50 such as a and b changes depending on a distance and the like between the first projection portion 1a and the second projection portion 1b and the projection object 6. However, since this method uses a ratio of x1 and x2 (x2/x1), the coordinate space corresponding to the non-projection range 8a can be set regardless of the relationship.

As another specific example of the setting of the coordinate space by the projection system 10, while illustration is not provided, a positional relationship of each of the first projection portion 1a and the second projection portion 1b in the projection system 10 or the distance to the projection object 6 may be detected by communicating with the first projection portion 1a and the second projection portion 1b or using a position sensor, and the coordinates of each of the points p1 to p3 may be acquired based on obtained positional information. Even in this case, the control device 4 may calculate x1 and x2 based on the acquired coordinates of each of the points p1 to p3 and set the coordinate space based on calculated x1 and x2.

As still another specific example of the setting of the coordinate space by the projection system 10, while illustration is not provided, information about b preset in the projection system 10 may be used without using the input information provided from the user by an operation. Preset b can be selected by an operation of the user or automatic determination by the projection system. After b is automatically determined by the projection system 10, the user may check a result using a chart. A plurality of pieces of information can be downloaded as the preset of b.

The control device 4 sets the coordinate space based on the input information including information from which the length (x1) of the first projection range 7a in the horizontal direction and the distance (x2) between the first projection range 7a and the second projection range 7b can be derived. Accordingly, the coordinate space corresponding to the non-projection range 8a can be set.

In the example in FIG. 9, while a configuration of setting the coordinate space based on the length (x1) of the first projection range 7a in the horizontal direction and the distance (x2) between the first projection range 7a and the second projection range 7b is described, a configuration of setting the coordinate space based on a length of the second projection range 7b in the horizontal direction and the distance (x2) between the first projection range 7a and the second projection range 7b by the same processing may be used. Alternatively, a configuration of setting the coordinate space based on the length (x1) of the first projection range 7a in the horizontal direction, the length of the second projection range 7b in the horizontal direction, and the distance (x2) between the first projection range 7a and the second projection range 7b may be used.

While a configuration of using information (for example, x1 and x2) related to distance as the input information for setting the coordinate space is described, the input information is not limited to information related to distance and may be information related to speed or time. This will be described using FIG. 10 to FIG. 14 below.

Specific Example 2 of Setting of Coordinate Space by Projection System 10

Figure 10:
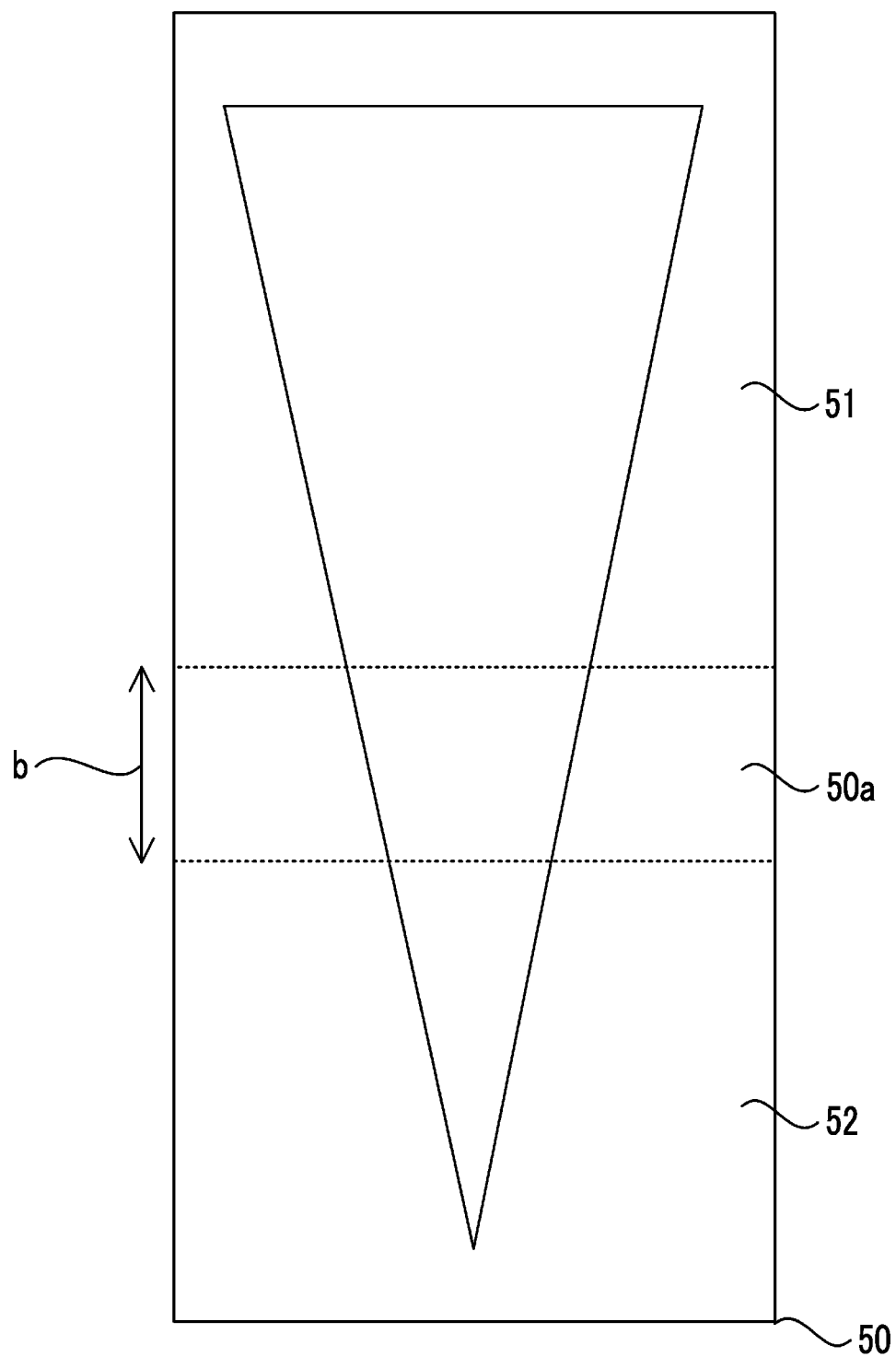
FIG. 10 is a diagram (Part 1) for describing Specific Example 2 of the setting of the coordinate space by the projection system 10.
Figure 11:
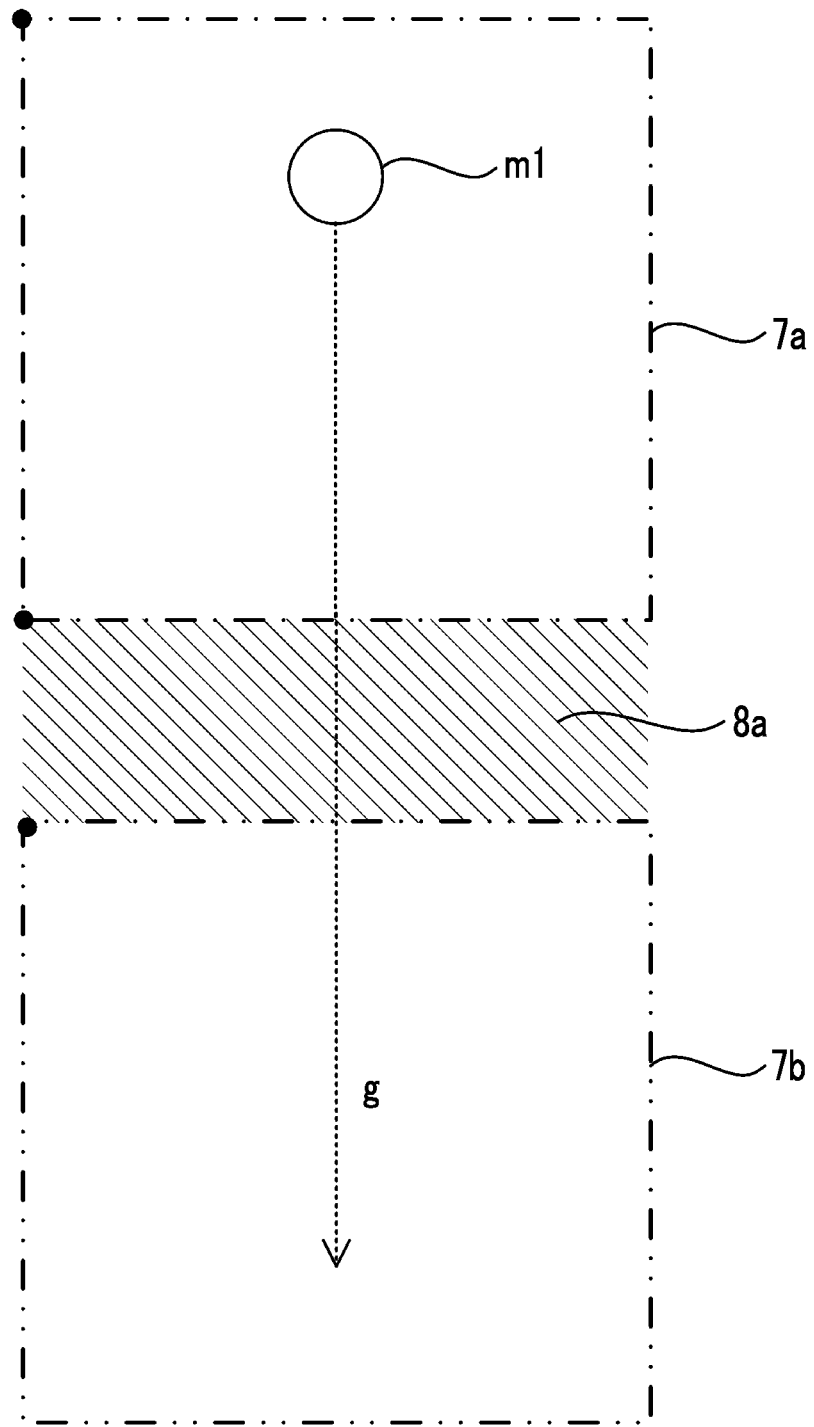
FIG. 11 is a diagram (Part 2) for describing Specific Example 2 of the setting of the coordinate space by the projection system 10.
Figure 12:
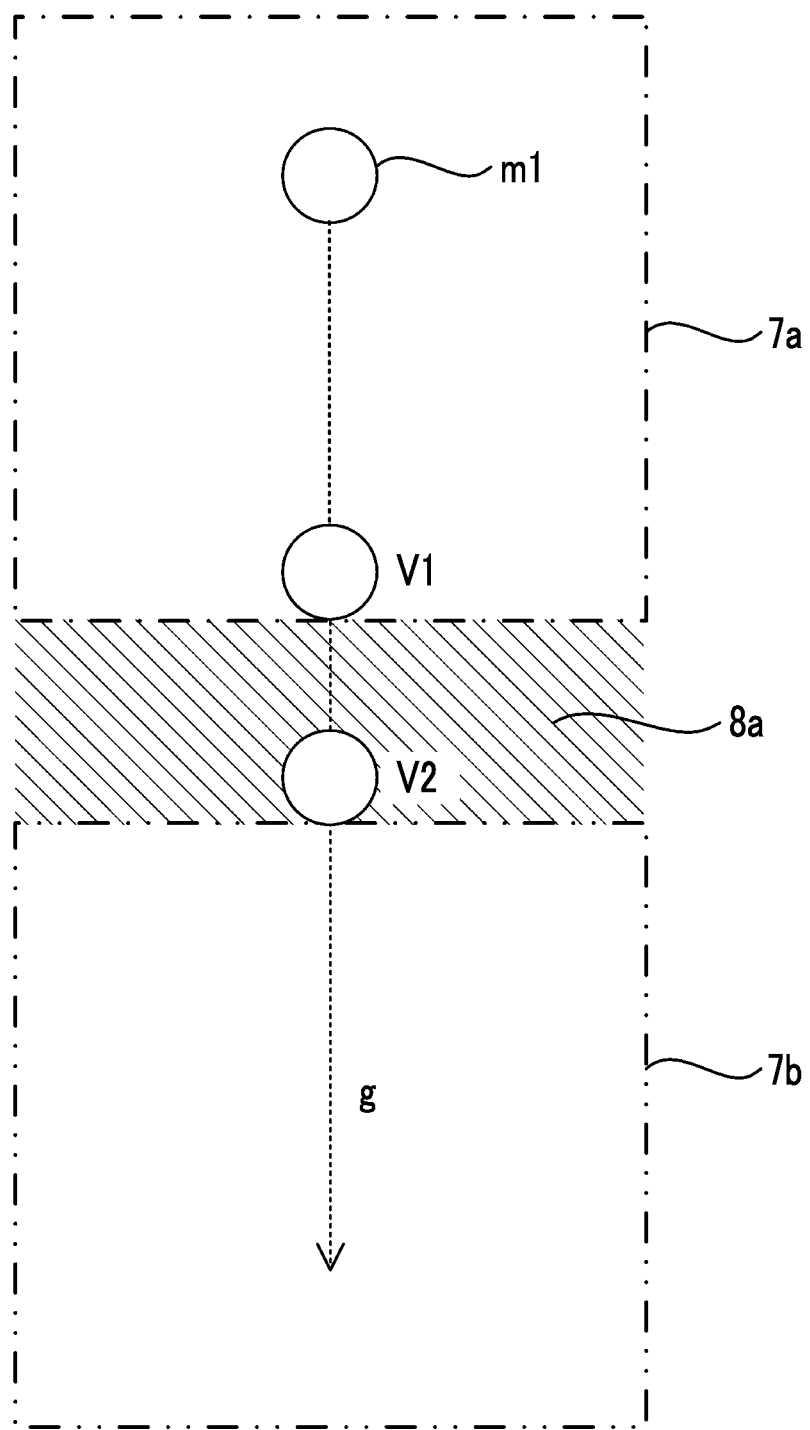
FIG. 12 is a diagram (Part 3) for describing Specific Example 2 of the setting of the coordinate space by the projection system 10.

FIG. 10 to FIG. 12 are diagrams for describing Specific Example 2 of the setting of the coordinate space by the projection system 10. In the examples illustrated in FIG. 10 to FIG. 12, the first projection range 7a and the second projection range 7b are vertically arranged. In this case, for example, the content image 50 is a vertically long image as illustrated in FIG. 10.

Here, as illustrated in FIG. 11, it is assumed that a moving object m1 falls down to pass through the non-projection range 8a from a predetermined position in the first projection range 7a and reaches the second projection range 7b. In this example, the moving object m1 is a sphere.

In addition, g denotes a constant acceleration (for example, pixels/second) of the moving object m1 in the content image 50. In this example, since the moving object m1 falls down in accordance with gravity, g denotes a gravitational acceleration converted into an acceleration in the content image 50. In this case, g is stored in advance in a memory of the control device 4.

In FIG. 12, V1 denotes a speed (for example, pixels/second) in a case where the moving object m1 reaches an end part of the first projection range 7a on the second projection range 7b side, and is an example of a first speed. In addition, V2 denotes a speed (for example, pixels/second) in the content image 50 in a case where the moving object m1 reaches an end part of the second projection range 7b on the first projection range 7a side, and is an example of a second speed. For example, each of V1 and V2 is input from the user by performing an operation on the operation reception portion 2 (as an example, an operation of a ten key or the like).

In addition, b (FIG. 10) denotes the coordinate space indicating the non-projection part 50a in the content image 50. In this example, the coordinate space is represented by the number of pixels of the non-projection part 50a in the vertical direction. For example, the control device 4 calculates b based on Expression (2) below and sets calculated b as the coordinate space. Since b is the number of pixels, a calculation result of b is rounded to an integer.

$$b=(V2^2-V1^2)/(2\times g)\ldots \quad (2)$$

The control device 4 may set the coordinate space based on the input information including information about the first speed (V1) in a case where the moving object m1 that moves from the first projection range 7a to the second projection range 7b at the set acceleration (g) reaches the end part of the first projection range 7a on the second projection range 7b side, and information about the second speed (V2) in a case where the moving object m1 reaches the end part of the second projection range 7b on the first projection range 7a side.

While a case where the moving object m1 that is a sphere falls down is assumed in the examples in FIG. 10 to FIG. 12, the movement of the moving object m1 is not limited to falling down and can be any movement at a constant acceleration. In this case, g is the constant acceleration of the movement. In addition, for example, in a case where the first projection range 7a and the second projection range 7b are arranged in the horizontal direction, a movement direction of the moving object m1 may be the horizontal direction.

Specific Example 3 of Setting of Coordinate Space by Projection System 10

Figure 13:
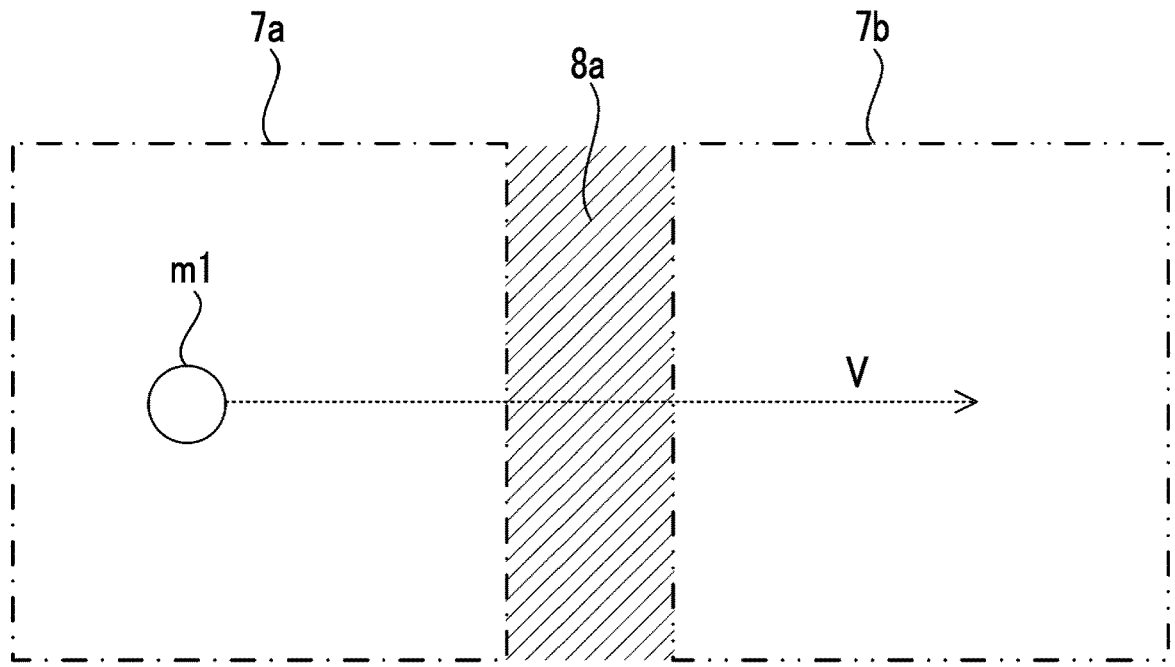
FIG. 13 is a diagram (Part 1) for describing Specific Example 3 of the setting of the coordinate space by the projection system 10.
Figure 14:
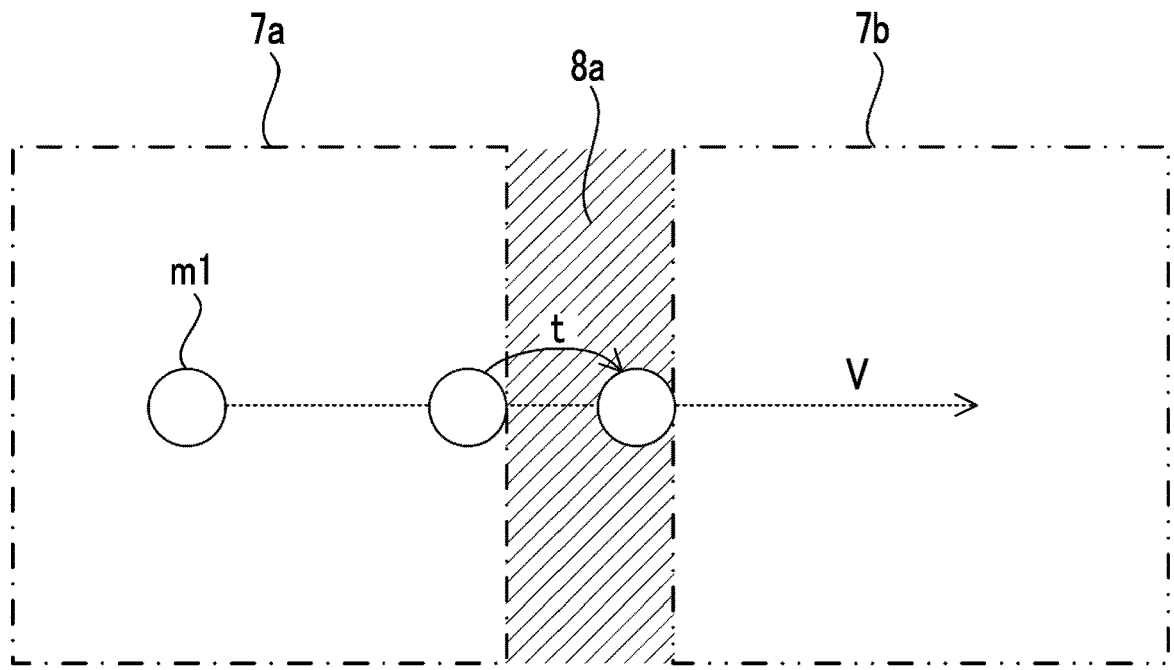
FIG. 14 is a diagram (Part 2) for describing Specific Example 3 of the setting of the coordinate space by the projection system 10.

FIG. 13 and FIG. 14 are diagrams for describing Specific Example 3 of the setting of the coordinate space by the projection system 10. In the examples illustrated in FIG. 13 and FIG. 14, the first projection range 7a and the second projection range 7b are horizontally arranged as in the example illustrated in FIG. 9.

Here, as illustrated in FIG. 13, it is assumed that the moving object m1 passes through the non-projection range 8a from a predetermined position in the first projection range 7a at a constant speed and reaches the second projection range 7b. In this example, the moving object m1 is a sphere.

In FIG. 14, V denotes a speed (for example, pixels/second) of the moving object m1 in the content image 50 and is an example of a third speed. V is stored in advance in the memory of the control device 4. Alternatively, V may be settable by the user using the operation reception portion 2.

In addition, t denotes a time period (for example, seconds) from when the moving object m1 reaches the end part of the first projection range 7a on the second projection range 7b side to when the moving object m1 reaches the end part of the second projection range 7b on the first projection range 7a side.

For example, the control device 4 calculates b based on Expression (3) below and sets calculated b as the coordinate space. Since b is the number of pixels, a calculation result of b is rounded to an integer.

$$b=t\times V\ldots \quad (3)$$

The control device 4 may set the coordinate space based on the input information including information about the time period (t) from when the moving object m1 that moves from the first projection range 7a to the second projection range 7b at the third speed (V) reaches the end part of the first projection range 7a on the second projection range 7b side to when the moving object m1 reaches the end part of the second projection range 7b on the first projection range 7a side.

Correction of Coordinate Space by Projection System 10

FIG. 15 and FIG. 16 are diagrams illustrating an example of correction of the coordinate space by the projection system 10. For example, in the example illustrated in FIG. 6, the control device 4 sets b as the coordinate space and then, for example, calculates B obtained by correcting b based on Expression (4) below.

$$B=\alpha b\ldots \quad (4)$$

For example, $\alpha$ is a predetermined coefficient and is a numerical value greater than 0. For example, $\alpha$ is stored in the memory of the control device 4. Alternatively, $\alpha$ may be predetermined for each content of the content image 50. Alternatively, $\alpha$ may be settable by the user using the operation reception portion 2.

The control device 4 generates the first projection image 51 and the second projection image 52 by setting B obtained by correcting b as the coordinate space. Accordingly, an impression of the content image 50 projected in a divided manner can be changed in accordance with $\alpha$.

For example, FIG. 15 is an example in which $\alpha$ is set to a value greater than 1. In this case, B is greater than b. Thus, a part included in the non-projection part 50a in the content image 50 is expanded. Consequently, projection results of the first projection image 51 and the second projection image 52 are obtained as in FIG. 16, and staging that provides a special impression to a person seeing the first projection image 51 and the second projection image 52 can be performed.

The control device 4 may generate the first projection image 51 and the second projection image 52 based on the set coordinate space (b), the correction coefficient ($\alpha$) for correcting the coordinate space, and the content image 50. Specifically, the control device 4 may generate the first projection image 51 and the second projection image 52 using each of parts between which the non-projection part 50a of the coordinate space (B) corrected using the correction coefficient ($\alpha$) is interposed in the content image 50.

Projection of Checking Image by Projection System 10

FIG. 17 to FIG. 19 are diagrams illustrating an example of projection of a checking image by the projection system 10.

For example, the control device 4 can project a checking image 170, illustrated in FIG. 17, different from the content image 50. The checking image 170 is a motion picture image of a moving object m2 that moves in an arrangement direction (in this example, the horizontal direction) of the first projection image 51 and the second projection image 52. In the example illustrated in FIG. 17, the checking image 170 is a motion picture image showing a state where the moving object m2 that is a sphere is thrown upward in an oblique direction and moves as if drawing a parabolic line in accordance with gravity.

The control device 4 generates a first image 171 for checking and a second image 172 for checking by performing the same processing as the processing of the content image 50 based on the coordinate space (B) corrected using the correction coefficient (α) on the checking image 170 based on the corrected coordinate space (B).

As illustrated in FIG. 18 and FIG. 19, the control device 4 causes the first projection portion 1a to project the first image 171 and causes the second projection portion 1b to project the second image 172. Accordingly, the user who sets the projection system 10 can determine whether or not an impression received from an image near the non-projection range 8a is as intended by the user by seeing the moving object m2 that moves from the first projection range 7a to the second projection range 7b.

In a case where the impression received from the image near the non-projection range 8a is not as intended by the user, the user changes the correction coefficient (α) using the operation reception portion 2. In a case where the correction coefficient (α) is changed, the control device 4 corrects the coordinate space (B) again using the changed correction coefficient (α) and projects the first image 171 for checking and the second image 172 for checking based on the coordinate space (B) corrected again from the first projection portion 1a and the second projection portion 1b.

FIG. 18 illustrates an example of the first image 171 and the second image 172 projected in a case where α is set to 1. FIG. 19 illustrates an example of the first image 171 and the second image 172 projected in a case where α is set to 1.5.

A guide information 173 is information that is included in the second image 172 projected to the second projection range 7b and indicates the current value of α. The guide information 173 may be included in the first image 171 projected to the first projection range 7a or may be included in both of the first image 171 and the second image 172. By including the guide information 173 for setting the correction coefficient (α) by the user in at least any of the first image 171 or the second image 172, the user easily adjusts the correction coefficient (α) while seeing the moving object m2.

In a case where the correction coefficient (α) is changed such that the impression received from the image near the non-projection range 8a is as intended by the user, the user performs a confirmation operation of providing an instruction to confirm the correction coefficient (α) on the operation reception portion 2. In a case where the confirmation operation is received, the control device 4 generates the first projection image 51 and the second projection image 52 from the content image 50 based on the coordinate space (B) at a time of the confirmation operation and projects the generated first projection image 51 and second projection image 52 from the first projection portion 1a and the second projection portion 1b, respectively.

The control device 4 performs a control of generating each of the first image 171 for checking and the second image 172 for checking based on the coordinate space (B) corrected using the correction coefficient (α) and the checking image 170, causing the first projection portion 1a to project the generated first image 171 for checking, and causing the second projection portion 1b to project the generated second image 172 for checking.

The control device 4 performs a control of generating the first projection image 51 and the second projection image 52 based on the coordinate space (B) corrected using the set correction coefficient (α) and the content image 50, causing the first projection portion 1a to project the first projection image 51, and causing the second projection portion 1b to project the second projection image 52 in accordance with a user operation (for example, the confirmation operation) after the first projection image 51 and the second projection image 52 are projected from the first projection portion 1a and the second projection portion 1b, respectively.

Accordingly, the impression of the content image 50 projected in a divided manner can be flexibly controlled in accordance with the intention of the user.

In addition, in a case where the user changes the correction coefficient (α) using the operation reception portion 2, the control device 4 performs a control of causing the first projection portion 1a and the second projection portion 1b to project the first image 171 for checking and the second image 172 for checking, respectively, based on the correction coefficient (α) after change.

By using the interactive first image 171 for checking and second image 172 for checking, the user can change the correction coefficient (α) while seeing the first image 171 for checking and the second image 172 for checking projected by the first projection portion 1a and the second projection portion 1b. Thus, the impression of the content image 50 projected in a divided manner can be further flexibly controlled in accordance with the intention of the user.

While a configuration in which the checking image 170 is the motion picture image of the moving object m1 that moves as if drawing a parabolic line while receiving an effect of gravity is described, the present invention is not limited to such a configuration. For example, in a case where the first projection range 7a and the second projection range 7b are arranged in the vertical direction, the checking image 170 may be a motion picture image showing a state where the moving object m1 illustrated in FIG. 11 falls down. In addition, the moving object is not limited to a sphere and may be an automobile, an airplane, or the like that moves at a constant acceleration (including 0), as long as the user can predict a motion of the moving object to a certain degree.

In addition, the checking image 170 may be an image including a still picture image that extends over the first projection range 7a and the second projection range 7b. As an example, the checking image 170 may be an image including an image of an isosceles triangle such as the content image 50 that extends over the first projection range 7a and the second projection range 7b.

Processing Performed by Control Device 4

Figure 20:
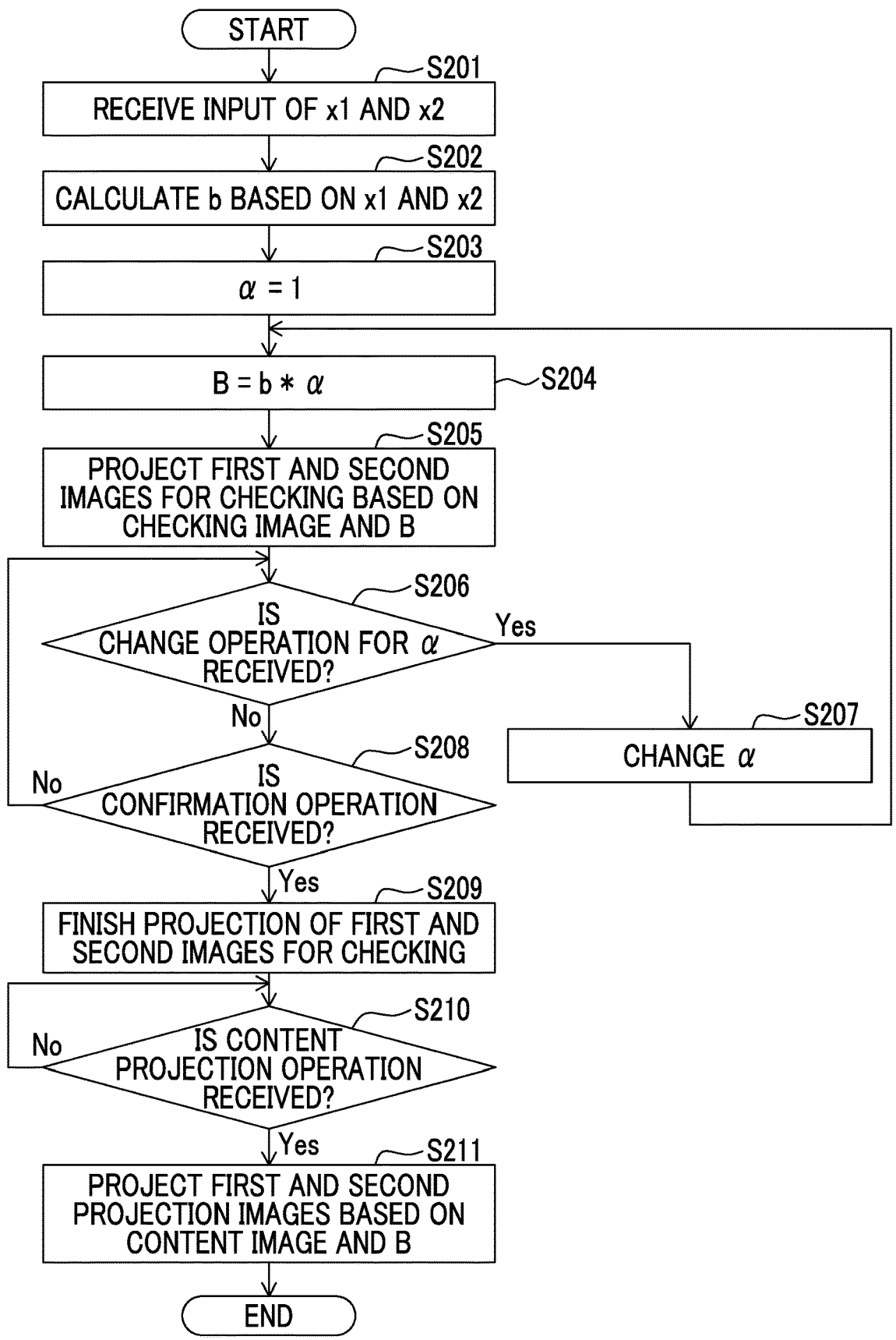
FIG. 20 is a flowchart illustrating an example of processing performed by a control device 4.

FIG. 20 is a flowchart illustrating an example of processing performed by the control device 4. Here, as in the example in FIG. 9, processing of the control device 4 in a case of correcting the coordinate space (b) using the information (x1 and x2) related to distance as the input information for setting the coordinate space (b) and further using the correction coefficient (α) as illustrated in FIG. 15 to FIG. 19 will be described.

First, the control device 4 receives an input of x1 and x2 from the user by the operation reception portion 2 (step S201). Next, the control device 4 calculates b as the coordinate space based on x1 and x2 input in step S201 (step S202).

Next, the control device 4 sets α that is the correction coefficient to 1 as an initial value (step S203). Next, the control device 4 calculates B as the coordinate space after correction by multiplying b calculated in step S202 by current α (step S204).

Next, the control device 4 causes the first projection portion 1a and the second projection portion 1b to project the first image 171 for checking and the second image 172 for checking, respectively, based on the checking image 170 and B calculated in step S204 (step S205).

Next, the control device 4 determines whether or not a change operation of providing an instruction to change α is received from the user by the operation reception portion 2 (step S206). In a case where the change operation is received (step S206: Yes), the control device 4 changes α in accordance with the received change operation (step S207) and returns to step S204. Accordingly, the first image 171 for checking and the second image 172 for checking on which α after change is reflected are projected.

In step S206, in a case where the change operation is not received (step S206: No), the control device 4 determines whether or not the confirmation operation of providing the instruction to confirm α is received from the user by the operation reception portion 2 (step S208). In a case where the confirmation operation is not received (step S208: No), the control device 4 returns to step S206.

In step S208, in a case where the confirmation operation is received (step S208: Yes), the control device 4 finishes the projection of the first image 171 for checking and the second image 172 for checking (step S209). Next, the control device 4 determines whether or not a content projection operation of providing an instruction to project the content image 50 is received (step S210) and waits until the content projection operation is received (step S210: No loop).

In step S210, in a case where the content projection operation is received (step S210: Yes), the control device 4 projects the first projection image 51 and the second projection image 52 based on the content image 50 and current B from the first projection portion 1a and the second projection portion 1b, respectively (step S211), and finishes the series of processing.

Other Examples of Non-Projection Range 8a

While a configuration in which the projection system 10 includes the first projection portion 1a and the second projection portion 1b and the non-projection range 8a is present between the first projection range 7a and the second projection range 7b arranged in the vertical direction and the horizontal direction is described, the present invention is not limited to such a configuration. The first projection range 7a and the second projection range 7b may be arranged obliquely to each other. As an example, the second projection range 7b may be arranged at the upper right of the first projection range 7a. In this case, for example, a non-projection range having a shape extending in an oblique direction is present between the first projection range 7a and the second projection range 7b.

In addition, the projection system 10 may include three or more projection portions, and projection ranges of the three or more projection portions may be separated from each other. In this case, a non-projection range is present among three or more projection ranges. As an example, a configuration in which the projection system 10 includes three projection portions will be described using FIG. 21 to FIG. 27.

Another Example of Projection System 10

Figure 21:
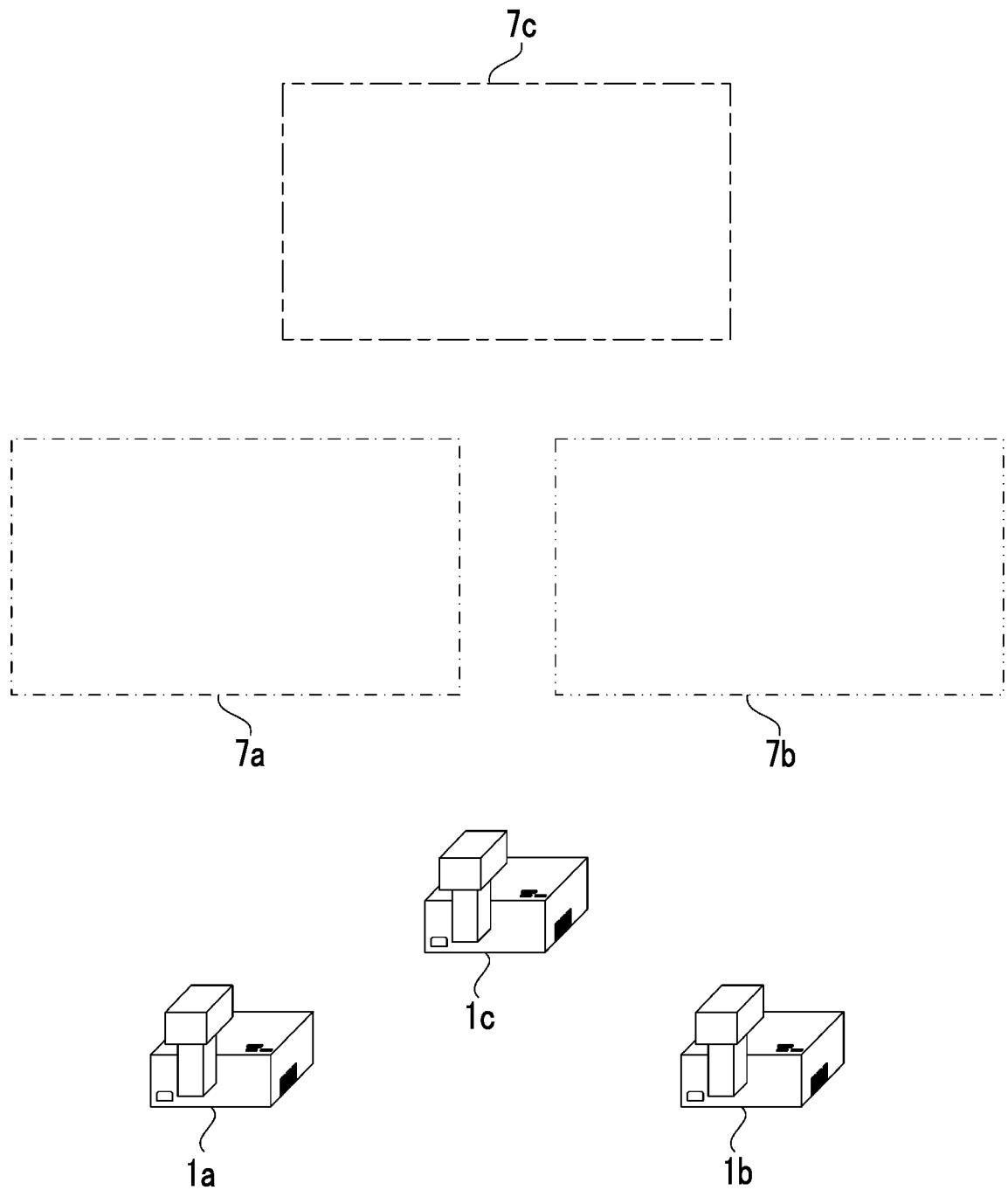
FIG. 21 is a diagram illustrating another example of the projection system 10.

FIG. 21 is a diagram illustrating another example of the projection system 10. In the example illustrated in FIG. 21, the projection system 10 includes a third projection portion 1c in addition to the first projection portion 1a and the second projection portion 1b as projection portions. A third projection range 7c is a projection range of the third projection portion 1c.

In the example illustrated in FIG. 21, the first projection range 7a and the second projection range 7b are horizontally arranged with respect to each other. The third projection range 7c is arranged above the first projection range 7a and the second projection range 7b separately from the first projection range 7a and the second projection range 7b.

Specific Example of Non-Projection Range 8a in Projection System 10 Illustrated in FIG. 21

Figure 22:
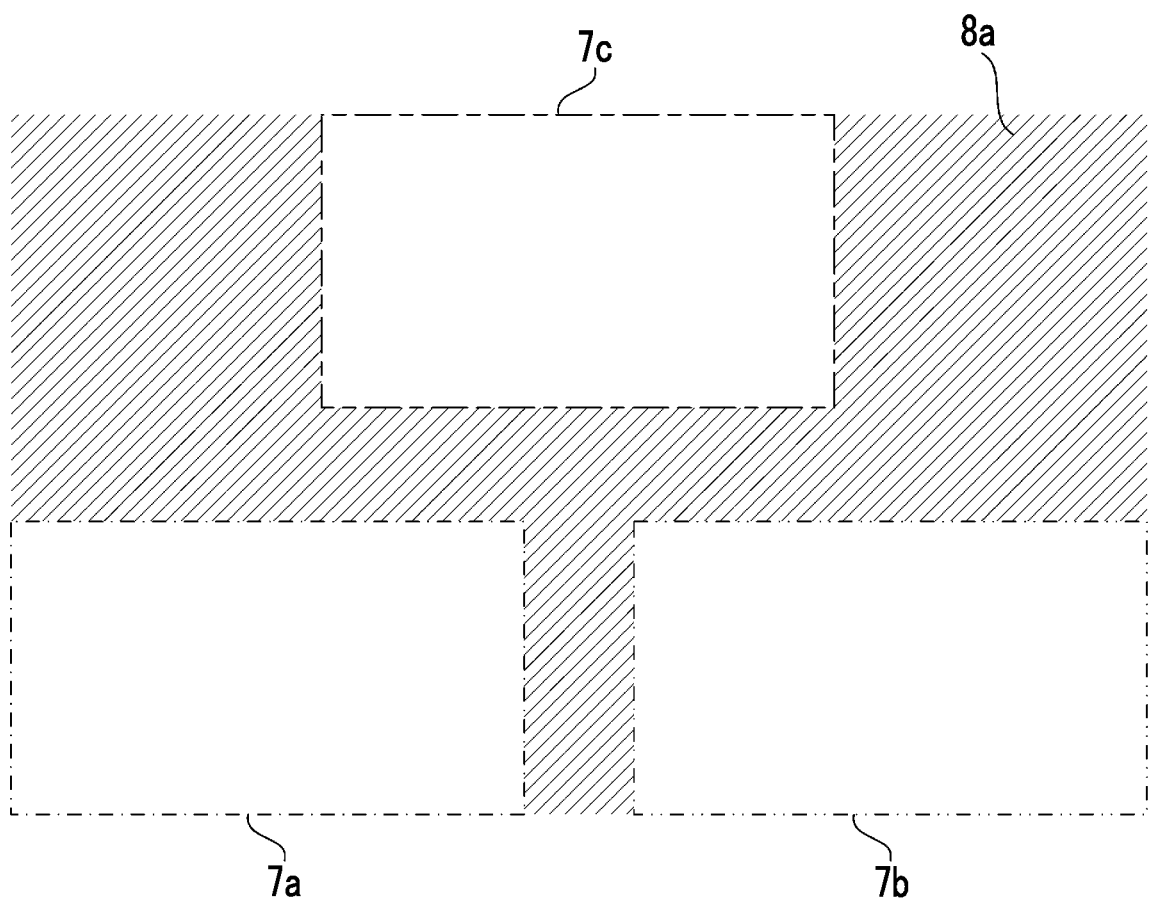
FIG. 22 is a diagram (Part 1) illustrating a specific example of a non-projection range 8a in the projection system 10 illustrated in FIG. 21.
Figure 24:
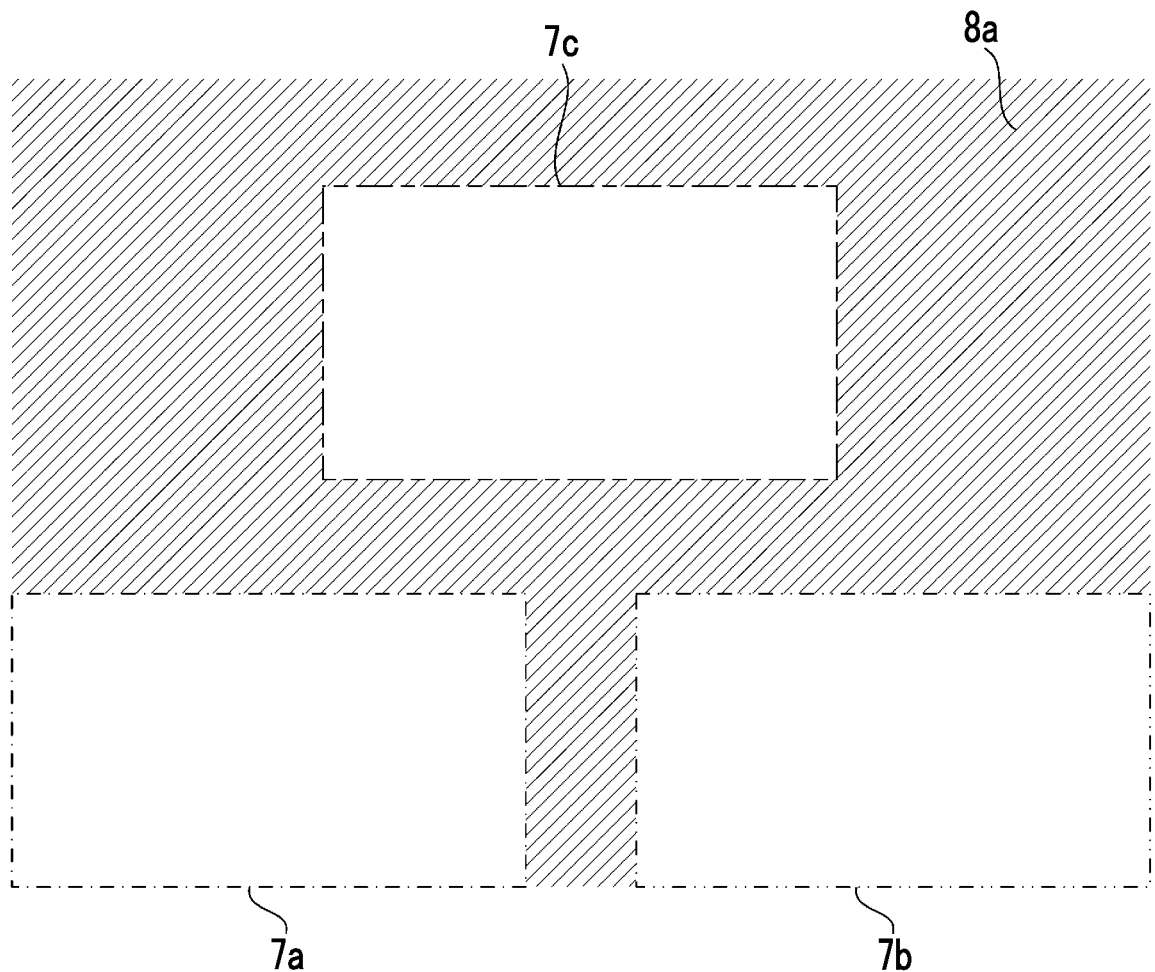
FIG. 24 is a diagram (Part 3) illustrating a specific example of the non-projection range 8a in the projection system 10 illustrated in FIG. 21.

FIG. 22 to FIG. 24 are diagrams illustrating a specific example of the non-projection range 8a in the projection system 10 illustrated in FIG. 21.

In the example in FIG. 21, for example, the non-projection range 8a can be set as a range excluding the first projection range 7a, the second projection range 7b, and the third projection range 7c in the smallest rectangle surrounding the first projection range 7a, the second projection range 7b, and the third projection range 7c as illustrated in FIG. 22.

However, the non-projection range 8a is not limited to the example illustrated in FIG. 22 and may be, for example, the range illustrated in FIG. 23 or FIG. 24. In addition, a shape of the non-projection range 8a may be selectable from these plurality of shapes by the user using the operation reception portion 2.

Specific Example of Setting of Coordinate Space by Projection System 10

Figure 25:
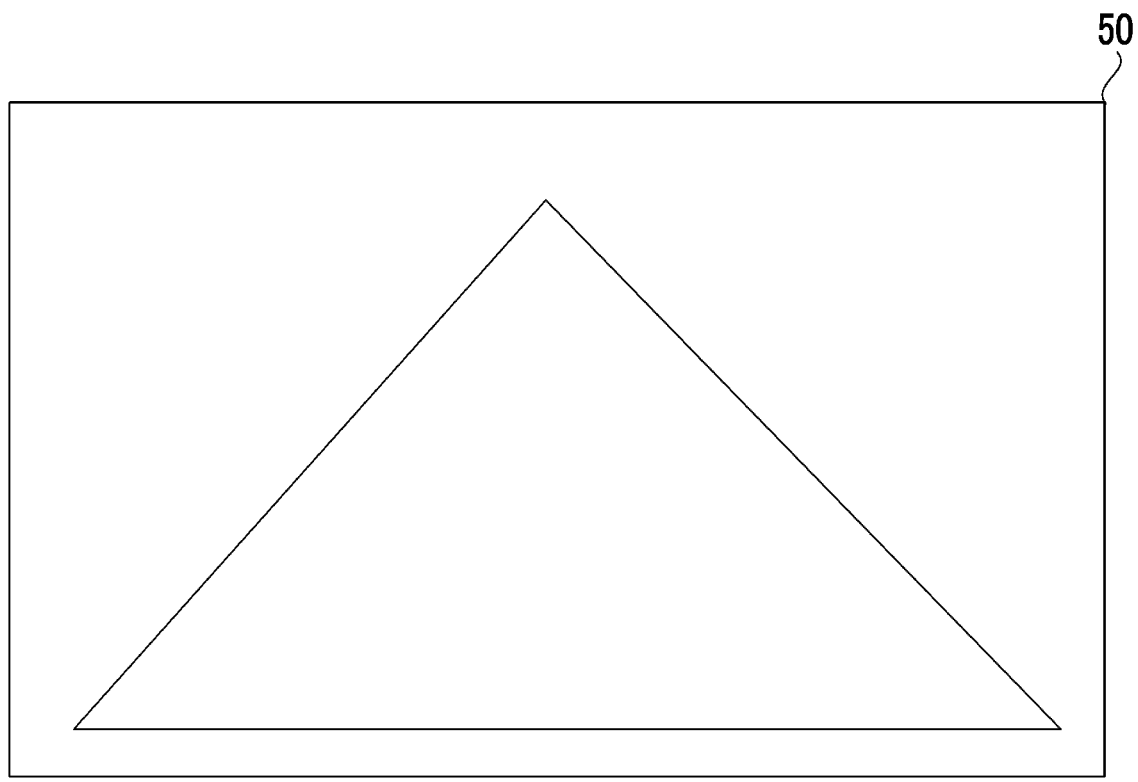
FIG. 25 is a diagram (Part 1) for describing a specific example of the setting of the coordinate space by the projection system 10.
Figure 26:
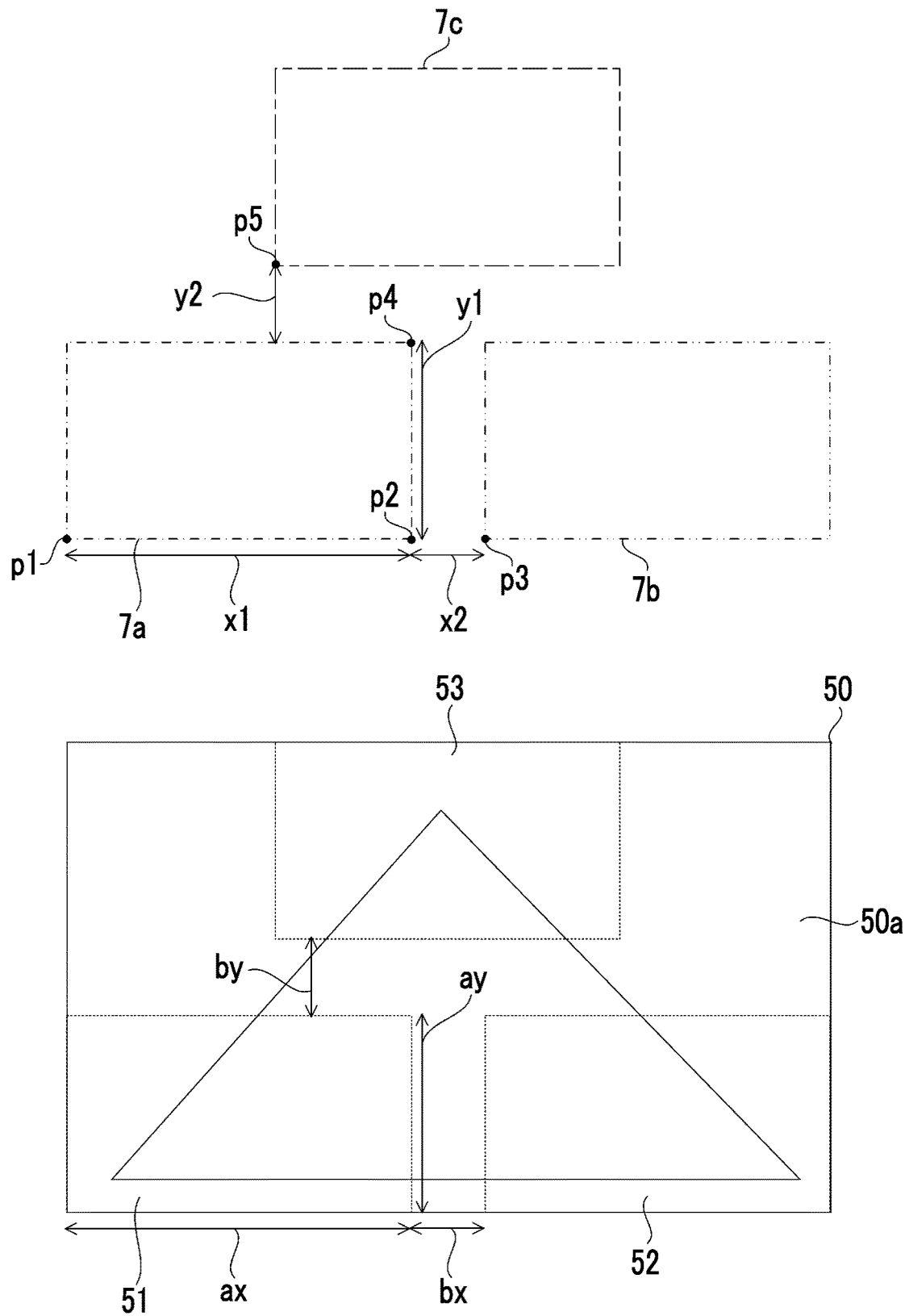
FIG. 26 is a diagram (Part 2) for describing a specific example of the setting of the coordinate space by the projection system 10.
Figure 27:
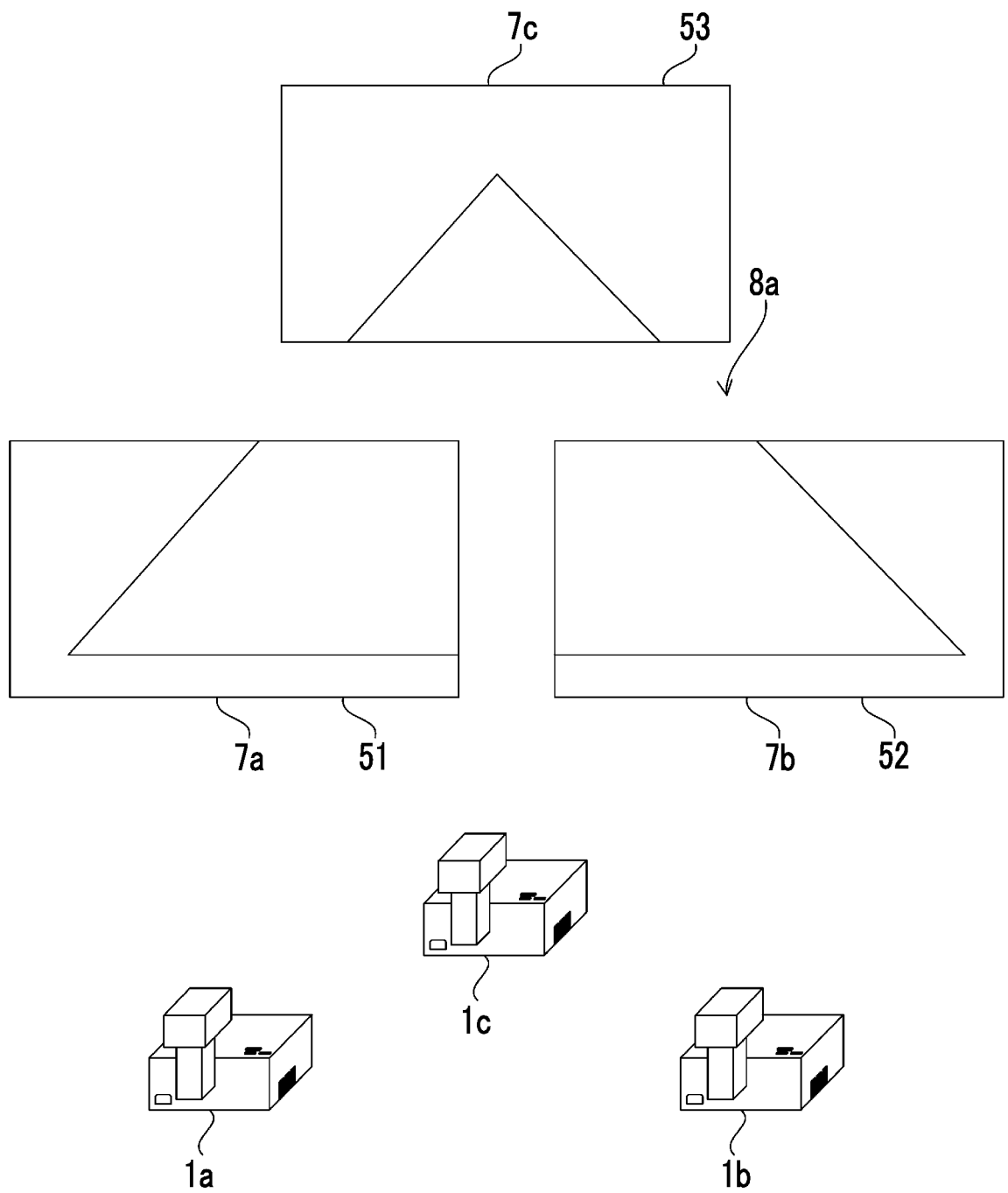
FIG. 27 is a diagram (Part 3) for describing a specific example of the setting of the coordinate space by the projection system 10.

FIG. 25 to FIG. 27 are diagrams for describing a specific example of the setting of the coordinate space by the projection system 10. In this example, it is assumed that the content image 50 is a still picture showing a triangle as illustrated in FIG. 25. In addition, in this example, the non-projection range 8a illustrated in FIG. 23 is assumed.

In FIG. 26, x1 denotes the length (actual length on the projection object 6) of the first projection range in the arrangement direction (in this example, the horizontal direction) of the first projection range 7a and the second projection range 7b. In addition, x2 denotes the distance (actual distance on the projection object 6) between the first projection range 7a and the second projection range 7b. In addition, y1 denotes the length (actual length on the projection object 6) of the first projection range 7a in an arrangement direction (in this example, the vertical direction) of the first projection range 7a and the second projection range 7b, and the third projection range 7c. In addition, y2 denotes a distance (actual distance on the projection object 6) between the first projection range 7a and the second projection range 7b, and the third projection range 7c. For example, x1, x2, y1, and y2 are input from the user by performing an operation on the operation reception portion 2 (as an example, an operation of a ten key or the like).

The first projection image 51, the second projection image 52, and a third projection image 53 are images that are generated from the content image 50 and are projected by the first projection portion 1a, the second projection portion 1b, and the third projection portion 1c, respectively. That is, the first projection image 51, the second projection image 52, and the third projection image 53 are projected to the first projection range 7a, the second projection range 7b, and the third projection range 7c, respectively.

In addition, ax denotes the number of pixels of the first projection image 51 in the arrangement direction (in this example, the horizontal direction) of the first projection range 7a and the second projection range 7b. In addition, ay denotes the number of pixels of the first projection image 51 in the arrangement direction (in this example, the vertical direction) of the first projection range 7a and the second projection range 7b, and the third projection range 7c.

For example, ax and ay are calculated by deriving a part corresponding to the first projection range 7a in the content image 50 in a case where the content image 50 is mapped to the smallest rectangle surrounding the first projection range 7a, the second projection range 7b, and the third projection range 7c.

In addition, bx denotes the number of pixels between the first projection image 51 and the second projection image 52 in the non-projection part 50a. In addition, by denotes the number of pixels between the first projection image 51 and the second projection image 52, and the third projection image 53 in the non-projection part 50a.

In this example, the coordinate space indicating the non-projection part 50a is represented by bx and by. For example, the control device 4 calculates bx and by based on Expression (5) below and sets calculated bx and by as the coordinate space. Since bx and by are the number of pixels, calculation results of bx and by are rounded to integers.

$$bx = ax \times (X2/X1)$$
$$by = ay \times (Y2/Y1) \ldots \quad (5)$$

The control device 4 generates the first projection image 51, the second projection image 52, and the third projection image 53 based on the set coordinate space (bx and by) and the content image 50 illustrated in FIG. 25. As illustrated in FIG. 27, the control device 4 projects the generated first projection image 51 to the first projection range 7a from the first projection portion 1a, projects the generated second projection image 52 to the second projection range 7b from the second projection portion 1b, and projects the generated third projection image 53 to the third projection range 7c from the third projection portion 1c.

While a configuration in which x1, x2, y1, and y2 are input from the user by performing the operation on the operation reception portion 2 is described, the present invention is not limited to such a configuration. For example, a configuration in which coordinates (coordinates associated with an actual position on the projection object 6) of each of the lower left point p1 of the first projection range 7a, the lower right point p2 of the first projection range 7a, the lower left point p3 of the second projection range 7b, an upper right point p4 of the first projection range 7a, and a lower left point p5 of the third projection range 7c are input from the user by performing the operation on the operation reception portion 2 may be used.

In this case, for example, various operations such as an operation of inputting numerical values or the like of coordinates and an operation of a pointer with which coordinates on the projection object 6 can be designated using an acceleration sensor or the like can be used as the operation performed on the operation reception portion 2. The control device 4 calculates x1, x2, y1, and y2 based on the coordinates of each of the input points p1 to p5 and sets the coordinate space as described above based on calculated x1, x2, y1, and y2.

Alternatively, while illustration is not provided, an imaging apparatus that images the projection object 6 may be provided in the projection system 10, and the coordinates of each of the points p1 to p5 may be acquired based on image analysis of a captured image obtained by imaging performed by the imaging apparatus. Even in this case, the control device 4 calculates x1, x2, y1, and y2 based on the acquired coordinates of each of the points p1 to p5 and sets the coordinate space based on calculated x1, x2, y1, and y2.

While a configuration of using information (for example, x1, x2, y1, and y2) related to distance as the input information for setting the coordinate space is described, the input information is not limited to information related to distance and may be information related to speed or time.

In FIG. 21 to FIG. 27, while a configuration in which the third projection range 7c is arranged above the first projection range 7a and the second projection range 7b is described, a configuration in which, for example, the first projection range 7a, the second projection range 7b, and the third projection range 7c are horizontally arranged in a row may be used.

For example, in the example illustrated in FIG. 1, the third projection range 7c may be arranged on a right side of the second projection range 7b. In this case, the non-projection range 8a between the first projection range 7a and the second projection range 7b and a non-projection range between the second projection range 7b and the third projection range 7c are present. For the non-projection range between the second projection range 7b and the third projection range 7c, the control device 4 performs the same processing as the processing related to the non-projection range 8a between the first projection range 7a and the second projection range 7b.

At least the following matters are disclosed in the present specification.

(1) A control method of a projection system that includes a first projection portion, a second projection portion, and a processor and performs projection based on a content image, the control method comprising, by the processor, setting a coordinate space corresponding to a non-projection range between a first projection range of the first projection portion and a second projection range of the second projection portion based on input information, and performing a control of generating a first projection image and a second projection image based on the set coordinate space and the content image, causing the first projection portion to project the first projection image, and causing the second projection portion to project the second projection image.

(2) The control method according to (1), in which the processor is configured to perform a control of generating the first projection image and the second projection image based on each of parts between which the non-projection range is interposed in the content image.

(3) The control method according to (1) or (2), in which the input information includes information from which a distance between the first projection range and the second projection range is derivable.

(4) The control method according to (3), in which the input information includes information from which a length of at least any of the first projection range or the second projection range in an arrangement direction of the first projection range and the second projection range and the distance are derivable.

(5) The control method according to (4), in which in a case where a length of the first projection range in the arrangement direction is denoted by x1, the distance is denoted by x2, the number of pixels of the first projection image in the arrangement direction is denoted by a, and the coordinate space is denoted by b, the processor is configured to perform a control of setting the coordinate space based on $$b=a\times(x2/x1).$$

(6) The control method according to any one of (1) to (5), in which the input information includes information about a first speed in a case where a moving object that moves from the first projection range to the second projection range at a set acceleration reaches an end part of the first projection range on the second projection range side, and information about a second speed in a case where the moving object reaches an end part of the second projection range on the first projection range side.

(7) The control method according to (6), in which in a case where the acceleration is denoted by g, the first speed is denoted by V1, the second speed is denoted by V2, and the coordinate space is denoted by b, the processor is configured to perform a control of setting the coordinate space based on $$b=(V2^2-V1^2)/(2\times g).$$

(8) The control method according to (7), in which the acceleration is a gravitational acceleration.

(9) The control method according to any one of (1) to (8), in which the input information includes information about a time period from when a moving object that moves from the first projection range to the second projection range at a third speed reaches an end part of the first projection range on the second projection range side to when the moving object reaches an end part of the second projection range on the first projection range side.

(10) The control method according to (9), in which in a case where the third speed is denoted by V, the time period is denoted by t, and the coordinate space is denoted by b, the processor is configured to perform a control of setting the coordinate space based on $$b=t\times V.$$

(11) The control method according to any one of (1) to (10), in which the projection system includes an input portion capable of receiving an input from a user, and the input information is information input by the input portion.

(12) The control method according to (11), in which the input portion includes an indicator with which an instruction for the non-projection range is providable.

(13) The control method according to any one of (1) to (12), in which the processor is configured to perform a control of generating the first projection image and the second projection image based on the set coordinate space, a correction coefficient for correcting the coordinate space, and the content image.

(14) The control method according to (13), in which the processor is configured to perform a control of generating the first projection image and the second projection image based on each of parts between which the non-projection range of the coordinate space corrected using the correction coefficient is interposed in the content image.

(15) The control method according to (13) or (14), in which the correction coefficient is a coefficient settable by a user operation.

(16) The control method according to (15), in which the processor is configured to perform a control of generating each of a first image for checking and a second image for checking based on the coordinate space corrected using the set correction coefficient and a checking image different from the content image, causing the first projection portion to project the first image for checking, and causing the second projection portion to project the second image for checking.

(17) The control method according to (16), in which a control of generating the first projection image and the second projection image based on the coordinate space corrected using the set correction coefficient and the content image, causing the first projection portion to project the first projection image, and causing the second projection portion to project the second projection image is performed in accordance with a user operation after the first image for checking and the second image for checking are projected from the first projection portion and the second projection portion, respectively.

(18) The control method according to (16) or (17), in which the checking image includes a motion picture image of a moving object that moves from the first projection range to the second projection range.

(19) The control method according to any one of (16) to (18), in which the checking image includes an image that extends over the first projection range and the second projection range.

(20) The control method according to any one of (16) to (19), in which the processor is configured to perform a control of including guide information for setting the correction coefficient by a user in at least any of the first image for checking or the second image for checking.

(21) The control method according to any one of (16) to (20), in which the processor is configured to, in a case where a user changes the correction coefficient, perform a control of causing the first projection portion and the second projection portion to project the first image for checking and the second image for checking, respectively, based on the correction coefficient after change.

(22) The control method according to any one of (1) to (21), in which the processor is configured to perform a control of generating the first projection image and the second projection image projected from the first projection portion and the second projection portion in accordance with aspect ratios of the first projection range and the second projection range, respectively.

(23) A projection apparatus that performs projection based on a content image, the projection apparatus comprising a first projection portion, a second projection portion, and a processor, in which the processor is configured to set a coordinate space corresponding to a non-projection range between a first projection range of the first projection portion and a second projection range of the second projection portion based on input information, and perform a control of generating a first projection image and a second projection image based on the set coordinate space and the content image, causing the first projection portion to project the first projection image, and causing the second projection portion to project the second projection image.

(24) A control program of a projection apparatus that includes a first projection portion, a second projection portion, and a processor and performs projection based on a content image, the control program causing the processor to execute a process comprising set a coordinate space corresponding to a non-projection range between a first projection range of the first projection portion and a second projection range of the second projection portion based on input information, and perform a control of generating a first projection image and a second projection image based on the set coordinate space and the content image, causing the first projection portion to project the first projection image, and causing the second projection portion to project the second projection image.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-080732) filed on Apr. 30, 2020, the content of which is incorporated in the present application by reference.

EXPLANATION OF REFERENCES

1: projection portion
1a: first projection portion
1b: second projection portion
1c: third projection portion
2: operation reception portion
2A, 3A: hollow portion
2a, 2b, 3a, 3c, 15a: opening
4: control device
4a: storage medium
6: projection object
7a: first projection range
7b: second projection range
7c: third projection range
8a: non-projection range
10: projection system
12: light modulation unit
15: housing
21: light source
22: light modulation portion
23: projection optical system
24: control circuit
31: second optical system
32, 122: reflective member
33: third optical system
34: lens
50: content image
50a: non-projection part
51: first projection image
52: second projection image
52a: complementary image
53: third projection image
101: body part
102: first member
103: second member
104: projection direction changing mechanism
105: shift mechanism
106: optical unit
121: first optical system
170: checking image
171: first image for checking
172: second image for checking
173: guide information
G1: image
p1 to p5: point
m1, m2: moving object

What is claimed is:

1. A control method of a projection system that includes a first projection portion, a second projection portion and a processor, and performs projection based on a content image, the control method comprising:
  by the processor,
   setting, based on input information, a coordinate space corresponding to a non-projection range between a first projection range of the first projection portion and a second projection range of the second projection portion; and
  performing a control of generating a first projection image and a second projection image based on the set coordinate space and the content image, causing the first projection portion to project the first projection image, and causing the second projection portion to project the second projection image.

2. The control method according to claim 1, which comprises:
  performing, by the processor, a control of generating the first projection image and the second projection image based on each of parts between which the non-projection range is interposed in the content image.

3. The control method according to claim 1,
  wherein the input information includes information from which a distance between the first projection range and the second projection range is derivable.

4. The control method according to claim 3,
  wherein the input information includes information from which a length of at least one of the first projection range and the second projection range in an arrangement direction of the first projection range and the second projection range and the distance are derivable.

5. The control method according to claim 4,
  wherein in a case where a length of the first projection range in the arrangement direction is denoted by x1, the distance is denoted by x2, number of pixels of the first projection image in the arrangement direction is denoted by a, and the coordinate space is denoted by b, the control method comprises: performing, by the processor, a control of setting the coordinate space based on $b = a \times (x2/x1)$.

6. The control method according to claim 1,
  wherein the input information includes information of a first speed when a moving object, that moves from the first projection range to the second projection range at a set acceleration, reaches an end part of the first projection range at a side of the second projection range, and information of a second speed when the moving object reaches an end part of the second projection range at a side of the first projection range.

7. The control method according to claim 6,
  wherein in a case where the acceleration is denoted by g, the first speed is denoted by V1, the second speed is denoted by V2, and the coordinate space is denoted by b, the control method comprises: performing, by the processor, a control of setting the coordinate space based on $b = (V2^2 - V1^2)/(2 \times g)$.

8. The control method according to claim 7,
wherein the acceleration is a gravitational acceleration.

9. The control method according to claim 1,
wherein the input information includes information of a time period from when a moving object, that moves from the first projection range to the second projection range at a third speed, reaches an end part of the first projection range at a side of the second projection range to when the moving object reaches an end part of the second projection range at a side of the first projection range.

10. The control method according to claim 9,
wherein in a case where the third speed is denoted by V, the time period is denoted by t, and the coordinate space is denoted by b, the control method comprises:
performing, by the processor, a control of setting the coordinate space based on $$b=t\times V.$$

11. The control method according to claim 1,
wherein the projection system includes an input portion capable of receiving an input from a user, and
the input information is information input by the input portion.

12. The control method according to claim 11,
wherein the input portion includes an indicator with which an instruction for the non-projection range is providable.

13. The control method according to claim 1, which comprises:
performing, by the processor, a control of generating the first projection image and the second projection image based on the set coordinate space, a correction coefficient for correcting the coordinate space and the content image.

14. The control method according to claim 13, which comprises:
performing, by the processor, a control of generating the first projection image and the second projection image based on each of parts between which the non-projection range of the coordinate space corrected by the correction coefficient is interposed in the content image.

15. The control method according to claim 13,
wherein the correction coefficient is a coefficient settable by a user operation.

16. The control method according to claim 15, which comprises:
performing, by the processor, a control of generating each of a first image for checking and a second image for checking based on the coordinate space corrected by the set correction coefficient and a checking image different from the content image, causing the first projection portion to project the first image for checking, and causing the second projection portion to project the second image for checking.

17. The control method according to claim 16, which comprises:
performing, by the processor, a control of generating the first projection image and the second projection image based on the coordinate space corrected by the set correction coefficient and the content image, causing the first projection portion to project the first projection image, and causing the second projection portion to project the second projection image, in accordance with a user operation after the first image for checking and the second image for checking are projected from the first projection portion and the second projection portion, respectively.

18. The control method according to claim 16,
wherein the checking image includes a motion picture image of a moving object that moves from the first projection range to the second projection range.

19. The control method according to claim 16,
wherein the checking image includes an image that extends over the first projection range and the second projection range.

20. The control method according to claim 16, which comprises:
performing, by the processor, a control of including guide information for setting the correction coefficient by a user in at least one of the first image for checking and the second image for checking.

21. The control method according to claim 16, which comprises:
in a case where a user changes the correction coefficient, performing, by the processor, a control of causing the first projection portion and the second projection portion to project the first image for checking and the second image for checking, respectively, based on the changed correction coefficient.

22. The control method according to claim 1, which comprises:
performing, by the processor, a control of generating the first projection image and the second projection image projected from the first projection portion and the second projection portion respectively, in accordance with an aspect ratio of the first projection range and an aspect ratio of the second projection range respectively.

23. A projection apparatus that performs projection based on a content image, the projection apparatus comprising:
a first projection portion;
a second projection portion; and
a processor,
wherein the processor is configured to:
set, based on input information, a coordinate space corresponding to a non-projection range between a first projection range of the first projection portion and a second projection range of the second projection portion; and
perform a control of generating a first projection image and a second projection image based on the set coordinate space and the content image, causing the first projection portion to project the first projection image, and causing the second projection portion to project the second projection image.

24. A non-transitory computer readable medium storing a control program of a projection apparatus that includes a first projection portion, a second projection portion and a processor, and performs projection based on a content image, the control program causing the processor to execute a process comprising:
setting, based on input information, a coordinate space corresponding to a non-projection range between a first projection range of the first projection portion and a second projection range of the second projection portion; and
performing a control of generating a first projection image and a second projection image based on the set coordinate space and the content image, causing the first projection portion to project the first projection image, and causing the second projection portion to project the second projection image.

\* \* \* \* \*